United States Patent
Kim et al.

(10) Patent No.: US 10,193,682 B2
(45) Date of Patent: Jan. 29, 2019

(54) APPARATUS AND METHOD FOR DEFINING PHYSICAL CHANNEL TRANSMIT/RECEIVE TIMINGS AND RESOURCE ALLOCATION IN TDD COMMUNICATION SYSTEM SUPPORTING CARRIER AGGREGATION

(71) Applicant: Samsung Electronics Co., Ltd., Suwon-si, Gyeonggi-do (KR)

(72) Inventors: Youngbum Kim, Seoul (KR); Seunghoon Choi, Suwon-si (KR); Joonyoung Cho, Suwon-si (KR); Hyoungju Ji, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/470,151

(22) Filed: Mar. 27, 2017

(65) Prior Publication Data

US 2017/0207900 A1    Jul. 20, 2017

Related U.S. Application Data

(63) Continuation of application No. 14/605,422, filed on Jan. 26, 2015, now Pat. No. 9,608,755, which is a
(Continued)

(30) Foreign Application Priority Data

May 31, 2011  (KR) .................. 10-2011-0051990
Jul. 12, 2011  (KR) .................. 10-2011-0069119
Dec. 20, 2011 (KR) .................. 10-2011-0138471

(51) Int. Cl.
*H04L 1/18* (2006.01)
*H04L 5/14* (2006.01)
(Continued)

(52) U.S. Cl.
CPC .............. *H04L 5/14* (2013.01); *H04L 1/1812* (2013.01); *H04L 1/1861* (2013.01); *H04L 41/08* (2013.01); *H04W 72/12* (2013.01); *H04W 88/08* (2013.01)

(58) Field of Classification Search
CPC ......... H04L 5/001; H04L 5/0055; H04L 5/14; H04W 72/0413
See application file for complete search history.

(56) References Cited

U.S. PATENT DOCUMENTS 7,010,318 B2   3/2006   Chang et al.
8,891,416 B2   11/2014  Yang et al.
(Continued)

FOREIGN PATENT DOCUMENTS

CN    101651523 A    2/2010
CN    102064921 A    5/2011
(Continued)

OTHER PUBLICATIONS

"Remaining issues in general frame work for aggregation of carriers with different UL/DL configurations", 3GPP Draft, R1-120070, XP050562653, Jan. 31, 2012.
(Continued)

*Primary Examiner* — Chandrahas B Patel
(74) *Attorney, Agent, or Firm* — Jefferson IP Law, LLP

(57) ABSTRACT

A method of defining physical channel transmit/receiving timings and resource allocation is provided for use in a Time Division Duplex (TDD) communication system supporting carrier aggregation. A method for receiving, at a base station, a Hybrid Automatic Repeat Request (HARQ) acknowledgement from a terminal in a Time Division Duplex (TDD) system supporting carrier aggregation of a primary cell and at least one secondary cell includes transmitting a downlink physical channel through one of the primary and secondary
(Continued)

cells, receiving the HARQ acknowledgement corresponding to the downlink physical channel of the primary cell at a first timing predetermined for the primary cell, and receiving the HARQ acknowledgement corresponding to the downlink physical channel of the secondary cell at second timing, wherein the second timing is determined according to the first timing.

20 Claims, 13 Drawing Sheets

Related U.S. Application Data continuation of application No. 13/485,838, filed on May 31, 2012, now Pat. No. 8,942,202.

(51) Int. Cl.
*H04L 12/24* (2006.01)
*H04W 72/12* (2009.01)
*H04W 88/08* (2009.01)

(56) References Cited

U.S. PATENT DOCUMENTS

| | | | |
|---|---|---|---|
| 9,167,567 B2* | 10/2015 | Lee | H04J 11/0069 |
| 2009/0232095 A1 | 9/2009 | Ahn et al. | |
| 2009/0249153 A1 | 10/2009 | Zhang | |
| 2009/0279460 A1 | 11/2009 | Sarkar | |
| 2011/0044239 A1 | 2/2011 | Cai et al. | |
| 2011/0268059 A1 | 11/2011 | Li et al. | |

FOREIGN PATENT DOCUMENTS

| | | |
|---|---|---|
| CN | 103036660 A | 4/2013 |
| KR | 10-2009-0094743 A | 9/2009 |
| KR | 10-2010-0134024 A | 12/2010 |
| KR | 10-2011-0033009 A | 3/2011 |
| WO | 2009/120701 A2 | 10/2009 |
| WO | 2009/137646 A2 | 11/2009 |
| WO | 2011/022485 A1 | 2/2011 |

OTHER PUBLICATIONS

"Different TDD configurations in inter-band CA", 3GPP, R2-121640 XP050606385, Mar. 30, 2012.
3GPP TSG-RAN WG1#62bis, R1-105260, Xi'an, China Oct. 15, 2010.
Nokia Siemens Networks, Nokia Corporation, Cell specific TDD configuration with inter-band CA, 3GPP TSG-RAN WG2 Meeting #74 R2-112946, Barcelona, Spain May 13, 2011.
Intel Corporation, Support of Mixed Inter-Band TDD Configurations in Rel-11 CA, 3GPP TSG RAN2#74 meeting R2-113216, Barcelona, Spain May 13, 2011.
3GPP TSG RAN WG1 Meeting #65, R1-111499 Barcelona, Spain May 13, 2011.
Samsung, Data scheduling in CA with different TDD ULDL configurations, 3GPP TSG RAN WG1 Meeting #66 R1-112503, Athens, Greece Aug. 26, 2011.
Samsung, DL/UL HARQ-ACK transmission in CA with different TDD configurations, 3GPP TSG RAN WG1 #66 R1-112502, Athens, Greece Aug. 26, 2011.

* cited by examiner

APPARATUS AND METHOD FOR DEFINING PHYSICAL CHANNEL TRANSMIT/RECEIVE TIMINGS AND RESOURCE ALLOCATION IN TDD COMMUNICATION SYSTEM SUPPORTING CARRIER AGGREGATION

PRIORITY

This is a continuation application of prior U.S. application Ser. No. 14/605,422, filed on Jan. 26, 2015, and will issue as U.S. Pat. No. 9,608,775 on Mar. 28, 2017, which is a continuation application of prior U.S. application Ser. No. 13/485,838, filed May 31, 2012, which issued as U.S. Pat. No. 8,942,202 on Jan. 27, 2015, and which claims the benefit under 35 U.S.C. § 119(a) of a Korean patent application filed on May 31, 2011 in the Korean Intellectual Property Office and assigned Serial No. 10-2011-0051990, and of a Korean patent application filed on Jul. 12, 2011 in the Korean Intellectual Property Office and assigned Serial No. 10-2011-0069119, and of a Korean patent application filed on Dec. 20, 2011 in the Korean Intellectual Property Office and assigned Serial No. 10-2011-0138471, the entire disclosures of which are hereby incorporated by reference.

BACKGROUND OF THE INVENTION

1. Field of the Invention

The present invention relates to a wireless communication system. More particularly, the present invention relates to a method for defining physical channel transmit/receiving timings and resource allocation in a Time Division Duplex (TDD) communication system supporting carrier aggregation.

2. Description of the Related Art

The mobile communication system has evolved into a high-speed, high-quality wireless packet data communication system (such as 3rd Generation Partnership Project (3GPP) High Speed Packet Access (HSPA) and Long Term Evolution (LTE), 3GPP2 High Rate Packet Data (HRPD), Ultra Mobile Broadband (UMB), and Institute of Electrical and Electronics Engineers (IEEE) 802.16e standard systems) to provide data and multimedia services beyond voice-oriented services.

As a representative broadband radio communication standard, LTE adopts Orthogonal Frequency Division Multiplexing (OFDM) in the downlink and Single Carrier Frequency Division Multiple Access (SC-FDMA) in the uplink. Such a multiple access technique is characterized in that the time-frequency resources carrying data or control information are arranged orthogonally to discriminate among the per-user data and/or control information.

In order to prepare against a decoding failure that occurs at initial transmission, LTE adopts Hybrid Automatic Repeat Request (HARQ) for retransmission of the decoding-failed data on the physical layer.

HARQ is a technique in which, when decoding fails, the receiver sends the transmitter a Negative ACKnowledgement (NACK) such that the transmitter retransmits the decoding-failed data. If the data is decoded successfully, the receiver sends the transmitter an ACKnowledgement (ACK) such that the transmitter sends new data.

One of the important features of the broadband communication system is to support a scalable bandwidth for providing a high speed data service. For example, the Long Term Evolution (LTE) system can support various bandwidths, e.g., 20/15/5/3/1.4 Mhz. The service providers can provide the service on a specific bandwidth selected among the diverse bandwidths. Likewise, there can be various terminals having different LTE capabilities for supporting a minimum 1.4 MHz bandwidth and up to a 20 MHz bandwidth.

Meanwhile, LTE-Advanced (LTE-A) aiming to meet the IMT-Advanced requirements can provide a broadband service at a data rate of up to 100 MHz through carrier aggregation. In order to support the high data rate transmission, the LTE-A system requires a bandwidth wider than that of the LTE system while preserving backward compatibility to the legacy systems for supporting LTE User Equipment (UE). For backward compatibility, system bandwidth of the LTE-A system is divided into a plurality of subbands or Component Carriers (CC) that can be used for transmission/reception of LTE UEs and aggregated for the high data rate transmission of the LTE-A system with the transmission/reception process of the legacy LTE system per component carrier.

Typically, the scheduling information for the data to be transmitted on the component carriers is transmitted to the UE in Downlink Control Information (DCI). The DCI can be defined in various formats, and one of the predefined DCI formats can be used according to whether scheduling information is for uplink or downlink, whether the DCI is compact DCI, whether spatial multiplexing with multiple antennas is applied, and whether the DCI is the power control DCI. For example, the DCI format 1 carrying the control information on the uplink data transmitted without application of Multiple Input Multiple Output (MIMO) can include the following control information.

Resource allocation type 0/1 flag: to differentiate between resource allocation type 0 and resource allocation type 1. Type 0 allocates resources in a unit of Resource Block Groups (RBGs) using a bitmap format. In the LTE/LTE-A system, the scheduling resource unit is a Resource Block (RB) representing time and frequency resource region, and each RBG can be composed of a plurality of RBs. The RBG can be a basic unit of scheduling resources in type 0. In type 1, specific RB can be allocated in the RBG.

Resource block assignment: to indicate resource blocks to be assigned to the UE. The basic unit of radio resource allocation is an RB representing a time and frequency region.

Modulation and coding scheme and redundancy version: to indicate modulation scheme and coding rate used in data transmission.

HARQ process number: to indicate the number of a HARQ process.

New Data Indicator (NDI): to indicate whether the packet is a new transmission or a retransmission.

Redundancy version: to indicate the redundancy version of HARQ.

Transmission Power Control (TPC) command for Physical Uplink Shared Channel (PUSCH): to indicate TPC command for PUSCH.

The DCI is channel-coded and modulated and then transmitted on a Physical Downlink Control Channel (PDCCH).

FIG. 1 is a diagram illustrating a principle of self-scheduling in an LTE-A system supporting carrier aggregation according to the related art. FIG. 1 is directed to a situation where an evolved Node B (eNB) schedules downlink data of a UE in an LTE-A system operating with two component carriers (e.g., CC#1 and CC#2).

Referring to FIG. 1, the DCI 101 transmitted on the CC#1 109 is formatted as defined in the legacy LTE standard, channel-coded, and then interleaved to generate PDCCH 103. The PDCCH 103 carries the scheduling information 113 about the PDCCH as the data channel allocated to the UE on the CC#1 109. The DCI 105 transmitted on the CC#2 111 is formatted as defined in the legacy LTE standard, channel-coded, and then interleaved to generate PDCCH 107. The PDCCH 107 carries the scheduling information 115 about a Physical Downlink Shared Channel (PDSCH) as the data channel allocated to the UE on the CC#2 111.

In the LTE-A system supporting carrier aggregation, the data and/or DCI for supporting the data transmission can be transmitted per component carrier as shown in FIG. 1. Such a scheduling technique is referred to as self-scheduling. In a case of DCI, however, it can be transmitted on another component carrier different form the component carrier carrying the data, and this is referred to as cross carrier scheduling. In the exemplary case of FIG. 1, when it is difficult to expect high reliability of DCI reception performance due to high interference on the CC#2, the DCI can be transmitted on the CC#1, which is experiencing relatively low interference.

In a case of PDSCH carrying data, it is possible to overcome the interference with frequency selective scheduling or HARQ. In a case of PDCCH carrying DCI, however, HARQ is not applied and it is not possible to apply the frequency selective scheduling due to system band-wide transmission characteristic and thus there is a need of a method for mitigating interference.

FIG. 2 is a diagram illustrating a principle of cross carrier scheduling in an LTE-A system supporting carrier aggregation according to the related art. FIG. 2 is directed to an exemplary cross carrier scheduling for an LTE-A UE operating on two aggregated carriers CC#1 209 and CC#2 219. It is assumed that CC#2 experiences relatively large interference as compared to CC#1 such that, when transmitting DCI as the scheduling information for the data transmission on CC#2, it is difficult to expect satisfactory DCI reception performance.

Referring to FIG. 2, the eNB can transmit the DCI on CC#1 209. In order to support the cross carrier scheduling, the eNB transmits a Carrier Indicator (CI) indicating the component carrier targeted by the DCI along with the DCI indicating the resource allocation information and transmission format of the scheduled data. For example, CI='00' indicates CC#1 209 and, CI='01' indicates CC#2 219.

The eNB combines the DCI 201 indicating resource allocation information and transmission format of the scheduled data 207 and the carrier indicator 202 to generate an extended DCI. The eNB performs channel coding, modulation, and interleaving on the extended DCI to generate a PDCCH 205. Here, the eNB maps the extended DCI to a respective region of the PDCCH 205 of CC#1 209.

The eNB combines the DCI 211 indicating the resource allocation information and transmission format of the data 217 scheduled on CC#2 and the carrier indicator 212 to generate an extended DCI. Next, the eNB maps the extended DCI to a respective region of the PDCCH 205 of CC#1 209.

The Time Division Duplex (TDD) system uses a common frequency for uplink and downlink which are discriminated in the time domain. In LTE and LTE-A TDD systems, the uplink and downlink signals are discriminated by subframe. A radio frame can be divided into equal number of uplink and downlink subframes according to the uplink and downlink traffic load. The number of uplink subframes may be greater than that of the downlink subframes and vice versa. In the LTE system, the subframe has a length of 1 ms, 10 subframes form a radio frame.

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Table 1 shows TDD configurations (TDD uplink-downlink configurations) defined in the LTE standard. In Table 1, subframe numbers 0 to 9 indicate the indices of subframes constituting one radio frame. Here, 'D' denotes a subframe reserved for downlink transmission, 'U' denotes a subframe reserved for uplink transmission, and 'S' denotes a special subframe.

Downlink Pilot Time Slot (DwPTS) can carry the downlink control information as the normal subframe does. If the DwPTS is long enough according to the configuration state of the special subframe, it is possible to carry the downlink data too. Guard Period (GP) is the interval used for a downlink-to-uplink switch and its length is determined according to the network configuration. Uplink Pilot Time Slot (UpPTS) can be used for transmitting a UE's Sounding Reference Signal (SRS) for uplink channel state estimation and a UE's Random Access Channel (RACH).

In a case of TDD uplink-downlink configuration #6, the eNB can transmit downlink data and/or control information at subframes #0, #5, and #9 and uplink data and/control information at subframes #2, #3, #4, #7, and #8. Here, # indicates number or index. The subframes #1 and #6 as special subframes can be used for transmitting downlink control information and/or downlink data selectively and SRS or RACH in uplink.

Since the downlink or uplink transmission is allowed for specific time duration in the TDD system, the timing relationship among the uplink and downlink physical channels such as control channel for data scheduling, scheduled data channel, and HARQ ACK/NACK channel (HARQ acknowledgement) corresponding to the data channel should be defined.

In LTE and LTE-A TDD systems, the timing relationship between PDSCH and Physical Uplink Control channel (PUCCH) carrying uplink HARQ ACK/NACK corresponding to the PDSCH or PUSCH is as follows.

The UE receives the PDSCH transmitted by the eNB at an $(n-k)^{th}$ subframe and transmits an uplink HARQ ACK/NACK corresponding to the received PDSCH at an $n^{th}$ subframe. Here, k denotes an element of a set K, and K is defined as shown in Table 2.

TABLE 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

FIG. 3 is a diagram illustrating a timing relationship between a PDSCH and an uplink HARQ ACK/NACK in a legacy LTE system operating with TDD uplink-downlink configuration #6 according to the related art. FIG. 3 shows which subframe carries uplink HARQ ACK/NACK corresponding to PDSCH that is transmitted in a downlink subframe or a special subframe in TDD uplink-downlink configuration #6 as defined in Table 2.

For example, the UE transmits, at subframe #7 of $i^{th}$ radio frame, the uplink HARQ ACK/NACK 303 corresponding to the PDSCH 301 transmitted by the eNB at subframe #1 of $i^{th}$ subframe. At this time, the DCI including the scheduling information on the PDSCH 301 is transmitted through a PDCCH of the subframe which also carries the PDSCH. For another example, the UE transmits, at the subframe #4 of $(i+1)^{th}$ radio frame, the uplink HARQ ACK/NACK 307 corresponding to PDSCH 305 transmitted by the eNB at subframe #9 of the $i^{th}$ radio frame. Likewise, the DCI including the scheduling information on the PDSCH 305 is transmitted through the PDCCH of the subframe which also carries PDSCH.

The LTE and LTE-A systems adopt an asynchronous HARQ in the downlink in which the data retransmission timing is not fixed. That is, when an HARQ ACK fed back by the UE in response to the HARQ initial transmission data transmitted by the eNB is received, the eNB determines the next HARQ retransmission timing freely according to the scheduling operation. The UE buffers the data that failed in decoding for a HARQ operation and combines the buffered data with the next HARQ retransmission data. In order to keep the reception buffer space to a predetermined level, a maximum number of HARQ processes are defined per TDD uplink-downlink configuration as shown in Table 3. One HARQ process is mapped to one subframe in time domain.

TABLE 3

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

Referring to Table 3, if the PDSCH 301 transmitted by the eNB at subframe #0 of the $i^{th}$ radio frame fails to decode, the UE transmits an HARQ NACK at the subframe #7 of $i^{th}$ radio frame. Upon receipt of the HARQ NACK, the eNB configures the retransmission data corresponding to PDSCH 301 as PDSCH 309 and transmits the PDSCH 309 along with the PDCCH. In the exemplary case of FIG. 3, the retransmission data is transmitted in the subframe #1 of $(i+1)^{th}$ radio frame by taking notice that the maximum number of downlink HARQ processes is 6 in the TDD uplink-downlink configuration #6 according to the definition of Table 3. This means that there are a total of 6 downlink HARQ processes 311, 312, 313, 314, 315, and 316 between the initial transmission, i.e., PDSCH 301, and the retransmission, i.e., PDSCH 309.

In order to apply the timing relationships between a physical channel, which are specified for use in the LTE TDD system, to the LTE-A system, extra operations, in addition to the conventional timing relationships, should be defined. In more detail, there is a need for defining the timing relationship among the PDCCH, PDSCH and uplink HARQ ACK/NACK, and a method for allocating uplink HARQ ACK/NACK transmission resources for supporting self-scheduling and/or cross carrier scheduling in the situation where the TDD uplink-downlink configurations are adopted to the respective carriers aggregated differ from each other.

SUMMARY OF THE INVENTION

Aspects of the present invention are to address at least the above-mentioned problems and/or disadvantages and to provide at least the advantages described below. Accordingly, an aspect of the present invention to define the timing relationship among Physical Downlink Control Channel (PDCCH), Physical Downlink Shared Channel (PDSCH), and uplink Hybrid Automatic Repeat Request (HARQ) ACKnowledgement (ACK)/Negative ACK (NACK) and provide a method for allocating uplink HARQ ACK/NACK transmission resources in a Time Division Duplex (TDD) wireless communication system achieving broadband resources with carrier aggregation, especially when the aggregated carriers use different TDD uplink-downlink configurations.

In accordance with an aspect of the present invention, a method for receiving, at a base station, a HARQ acknowledgement from a terminal in a TDD system supporting carrier aggregation of a primary cell and at least one secondary cell is provided. The method includes transmitting a downlink physical channel through one of the primary and secondary cells, receiving the HARQ acknowledgement corresponding to the downlink physical channel of the primary cell at a first timing predetermined for the primary cell, and receiving the HARQ acknowledgement corresponding to the downlink physical channel of the secondary cell at second timing, wherein the second timing is determined according to the first timing.

In accordance with another aspect of the present invention, a method for transmitting, at a terminal, a HARQ acknowledgement to a base station in a TDD system supporting carrier aggregation of a primary cell and at least one secondary cell is provided. The method includes receiving a downlink physical channel through one of the primary and second cells, transmitting the HARQ acknowledgement corresponding to the downlink physical channel of the primary cell at a first timing predetermined for the primary cell, and transmitting the HARQ acknowledgement corresponding to the downlink physical channel of the secondary cell at a second timing, wherein the second timing is determined according to the first timing.

In accordance with still another aspect of the present invention, a terminal for transmitting a HARQ acknowledgement to a base station in a TDD system supporting carrier aggregation of a primary cell and at least one secondary cell is provided. The terminal includes a transceiver which transmits and receives to and form a base station, and a controller which controls receiving a downlink physical channel through one of the primary and second cells, transmitting the HARQ acknowledgement corresponding to the downlink physical channel of the primary cell at a first timing predetermined for the primary cell, and transmitting the HARQ acknowledgement corresponding to the downlink physical channel of the secondary cell at a second timing, wherein controller configures the second timing according to the first timing.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
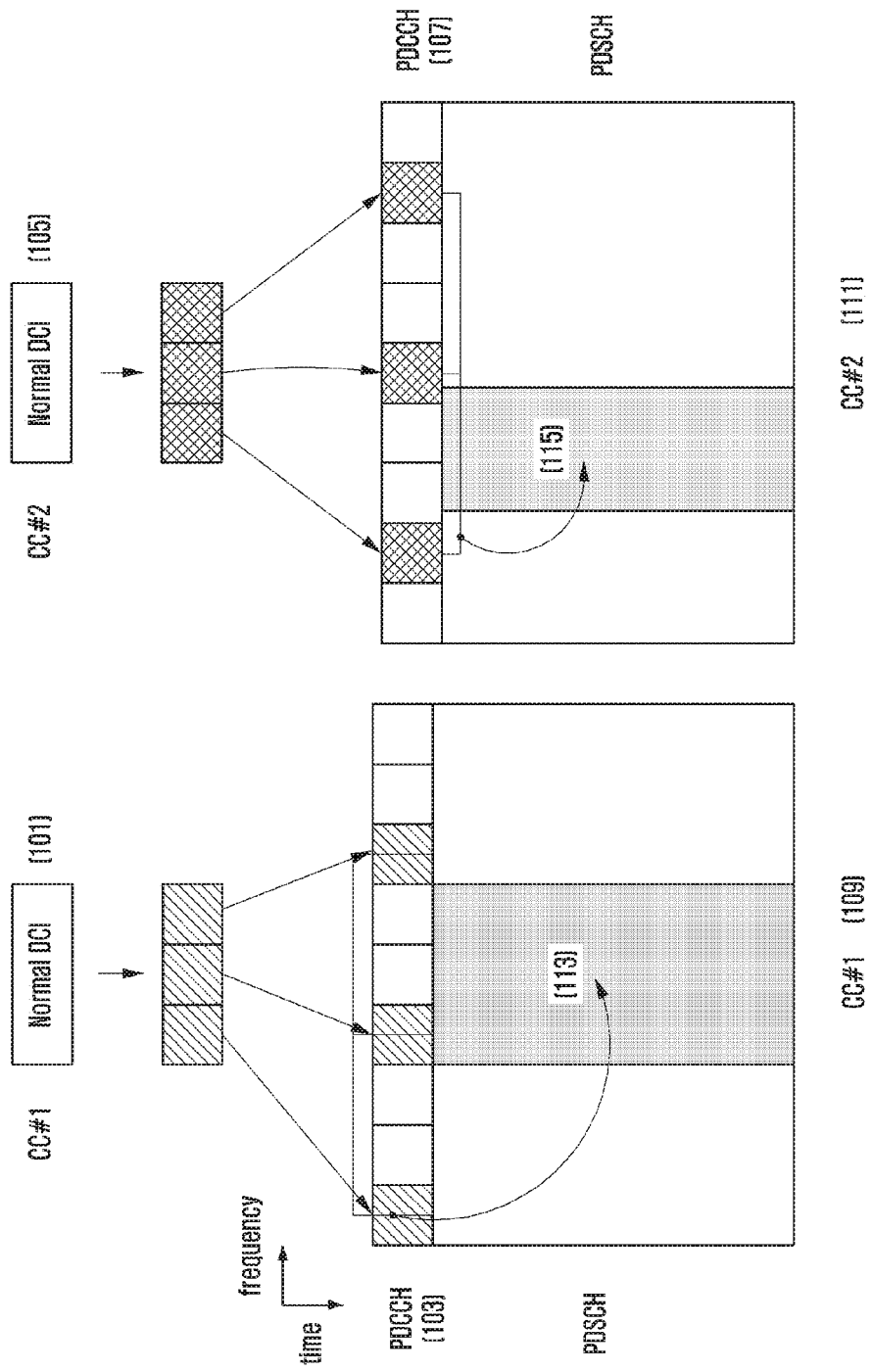
FIG. 1 is a diagram illustrating a principle of self-scheduling in a Long Term Evolution-Advanced (LTE-A) system supporting carrier aggregation according to the related art.
Figure 2:
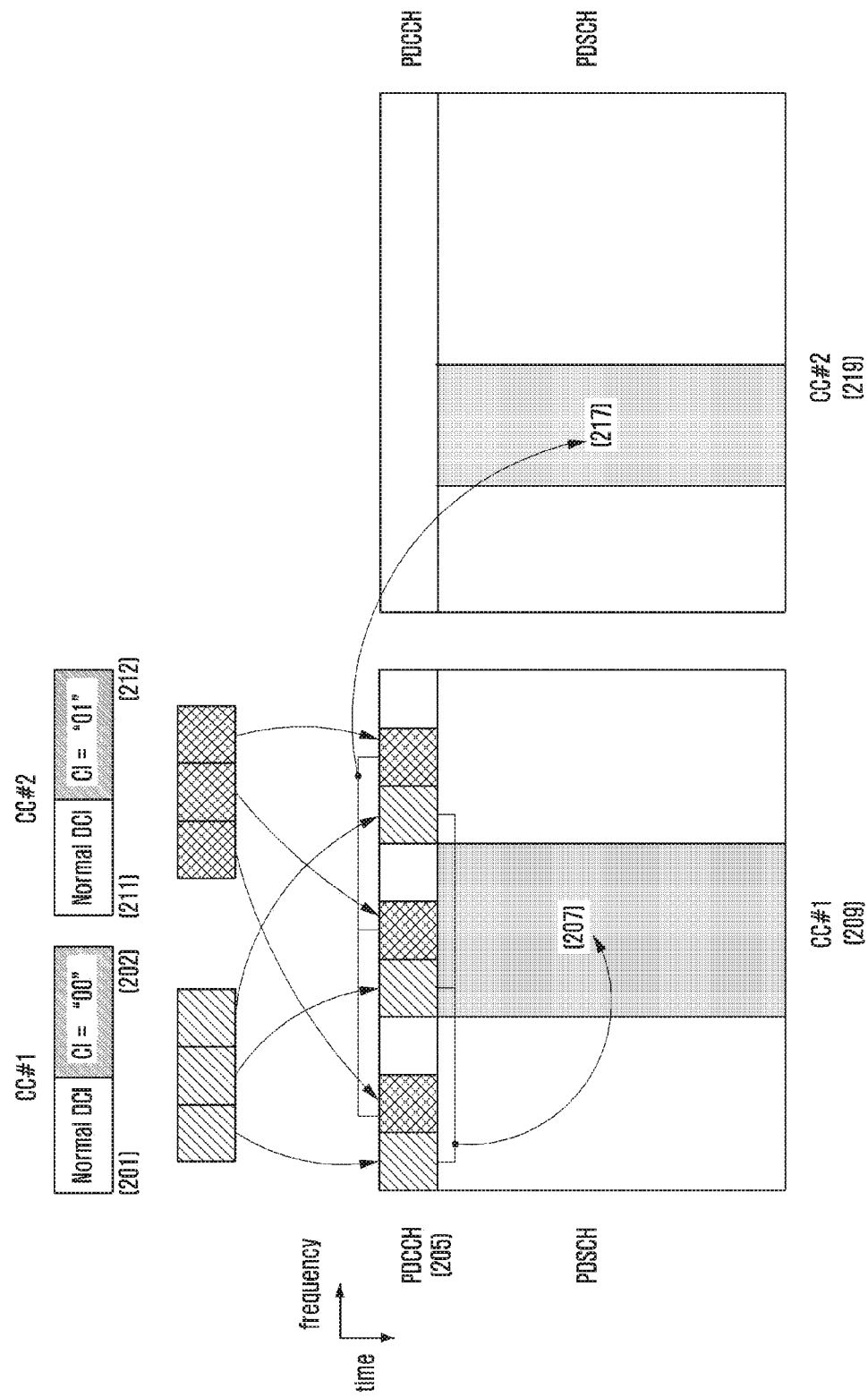
FIG. 2 is a diagram illustrating a principle of cross carrier scheduling in an LTE-A system supporting carrier aggregation according to the related art.
Figure 3:
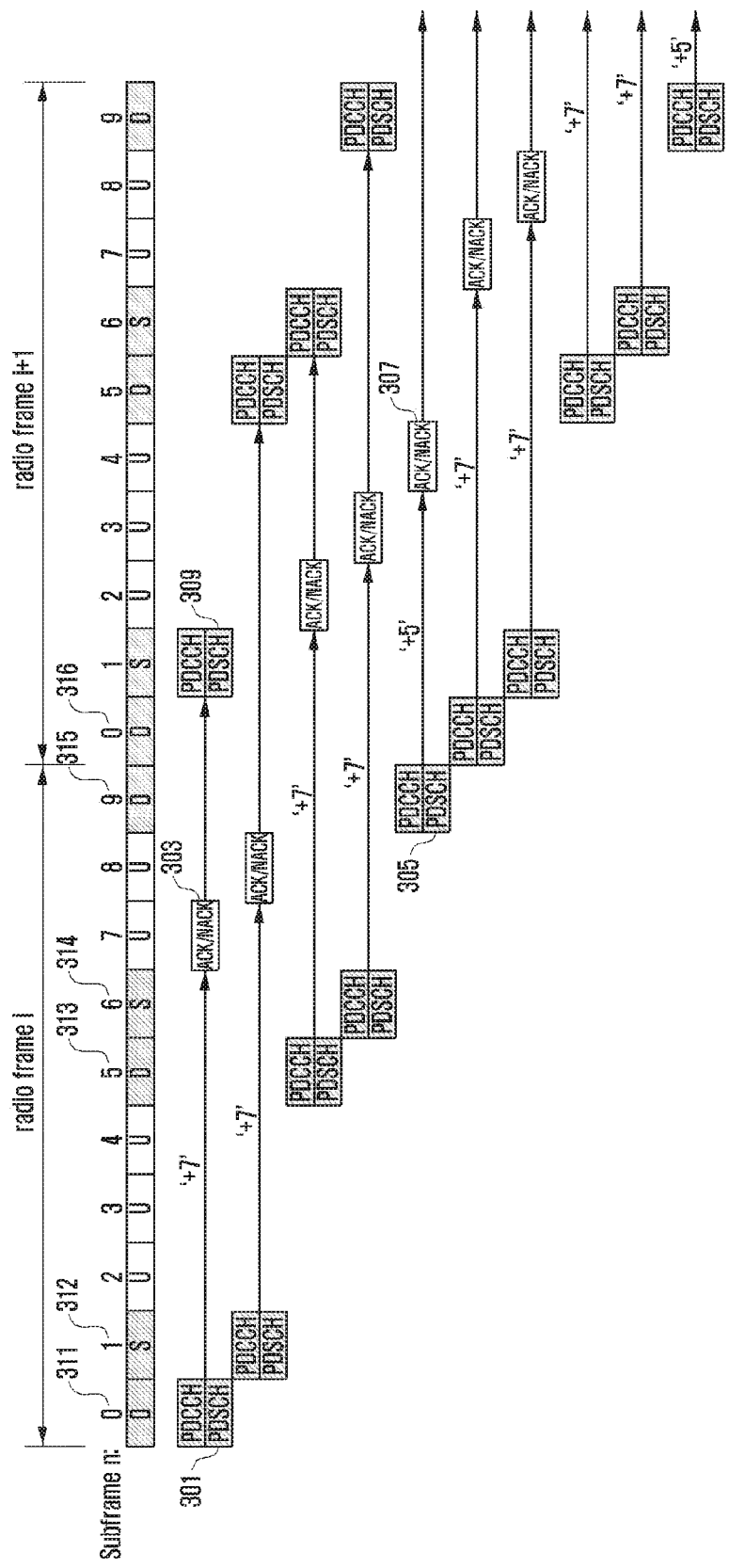
FIG. 3 is a diagram illustrating a timing relationship between a Physical Downlink Shared Channel (PDSCH) and uplink Hybrid Automatic Repeat Request (HARQ) ACKnowledgement (ACK)/Negative ACK (NACK) in a legacy Long Term Evolution (LTE) system operating with Time Division Duplex (TDD) uplink-downlink configuration #6 according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, a Base Station (BS) is an entity for allocating resources to a terminal and can be any of an enhanced Node B (eNB), a Node B, a BS, a radio access unit, a base station controller, and a node on a network.

The terminal can be a User Equipment (UE), a Mobile Station (MS), a cellular phone, a smartphone, a computer, or a multimedia system equipped with communication function. Although the present description is directed to the Advanced Evolved-Universal Mobile Telecommunications System (UMTS) Terrestrial Radio Access Network (E-UTRA) (or Long Term Evolution-Advanced (LTE-A)) supporting carrier aggregation, the present invention can be applied to other communication systems having similar technical background and channel format, with a slight modification, without departing from the spirit and scope of the present invention. For example, the timing relationship defined according to an aspect of an exemplary embodiment of the present invention can be applied to a multicarrier High Speed Packet Access (HSPA) system supporting carrier aggregation.

In the LTE-A system supporting carrier aggregation, if the component carrier carrying Downlink Control Information (DCI) for data transmission and the component carrier carrying the data scheduled as indicated by the DCI differ from each other, this is referred to as cross carrier scheduling. Meanwhile, if the component carrier carrying the DCI for data transmission and the component carrier carrying the data scheduled as indicated by the DCI are identical with each other, this is referred to as self-scheduling.

In the LTE-A system supporting carrier aggregation, if the probability of inter-carrier interference between the aggregated component carriers is low since the frequency bands of the carriers are not adjacent, it is possible to set the component carriers with different Time Division Duplex (TDD) uplink-downlink configurations. For example, the first component carrier can be configured to operate with the uplink and downlink subframes equal in number while the second component carrier is configured to operate with the downlink subframes larger than uplink subframes in number to increase downlink transmission capacity. For another example, the first component carrier can be configured to operate with the TDD uplink-downlink configuration supporting compatibility with Time Division-Synchronous Code Division Multiple Access (TD-SCDMA) as a legacy 3$^{rd}$ Generation (3G) TDD system to avoid interference between TD-SCDMA and Long Term Evolution (LTE) TDD systems while the second component carrier is configured with a TDD uplink-downlink configuration determined according to the traffic load without extra restriction.

A description is made of the carrier aggregation system including a Primary Cell (PCell) and a Secondary Cell (SCell). The PCell (or first type cell) provides the UE with basic radio resources on a primary frequency (or Primary Component Carrier; PCC) and is the cell to which the UE attempts initial connection or handover. The SCell (or second type cell) provides the UE with additional resources on the secondary frequency (or Secondary Component Carrier; SCC). It is assumed that a Hybrid Automatic Repeat Request (HARQ) ACKnowledgement (ACK)/Negative ACK (NACK) which the UE feeds back to the eNB is configured into a Physical Uplink Control Channel (PUCCH) and then transmitted through the PCell.

The subject matter of the present disclosure is to define the timing relationship among a Physical Downlink Control Channel (PDCCH), a Physical Downlink Shared Channel (PDSCH), and an uplink HARQ ACK/NACK and provide a method for allocating uplink HARQ ACK/NACK transmission resources in the TDD wireless communication system securing broadband resources through carrier aggregation, especially when the self-scheduling or cross carrier scheduling is selectively applied due to the difference between the TDD uplink-downlink configurations of the aggregated carriers.

Figure 4:
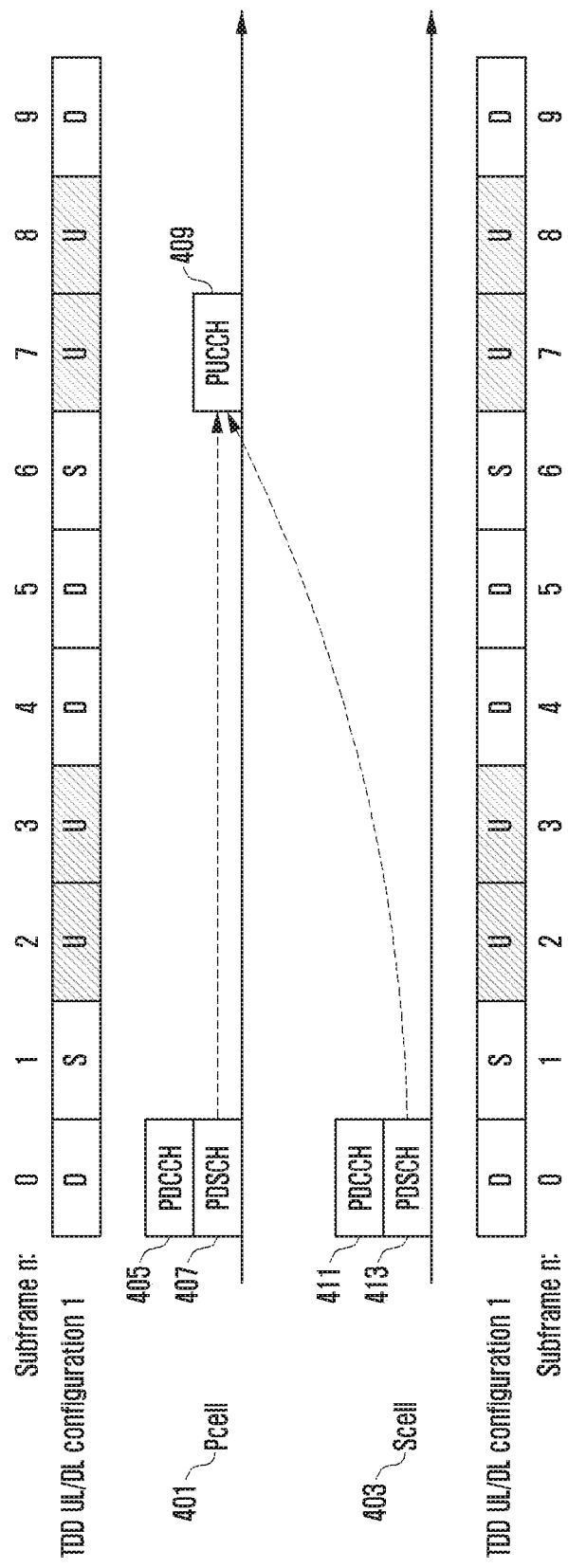
FIG. 4 is a diagram illustrating a timing relationship among physical channels for use in a case where TDD uplink-downlink configurations of aggregated carriers are identical with each other according to an exemplary embodiment of the present invention.

FIG. 4 is a diagram illustrating a timing relationship among physical channels for use in a case where TDD uplink-downlink configurations of aggregated carriers are identical with each other according to an exemplary embodiment of the present invention. FIG. 4 is directed to an exemplary case where both the PCell and SCell use the TDD uplink-downlink configuration #1.

Referring to FIG. 4, the eNB transmits PDSCH 407 to be transmitted through the PCell 401 and PDCCH 405 for scheduling PDSCH 407 at the subframe #0. The eNB also transmits PDSCH 413 to be transmitted through the SCell 403 and PDCCH 411 for scheduling the PDSCH 413 at the subframe #0. At this time, the transmission timing of the HARQ ACK/NACK corresponding to the PDSCHs 407 and 413 becomes the subframe #7 according to the timing relationship defined in the TDD uplink-downlink configuration #1. The UE transmits the HARQ ACK/NACKs corresponding to the respective PDSCHs 407 and 413 at the subframe #7 409 through the PCell 401.

Figure 5:
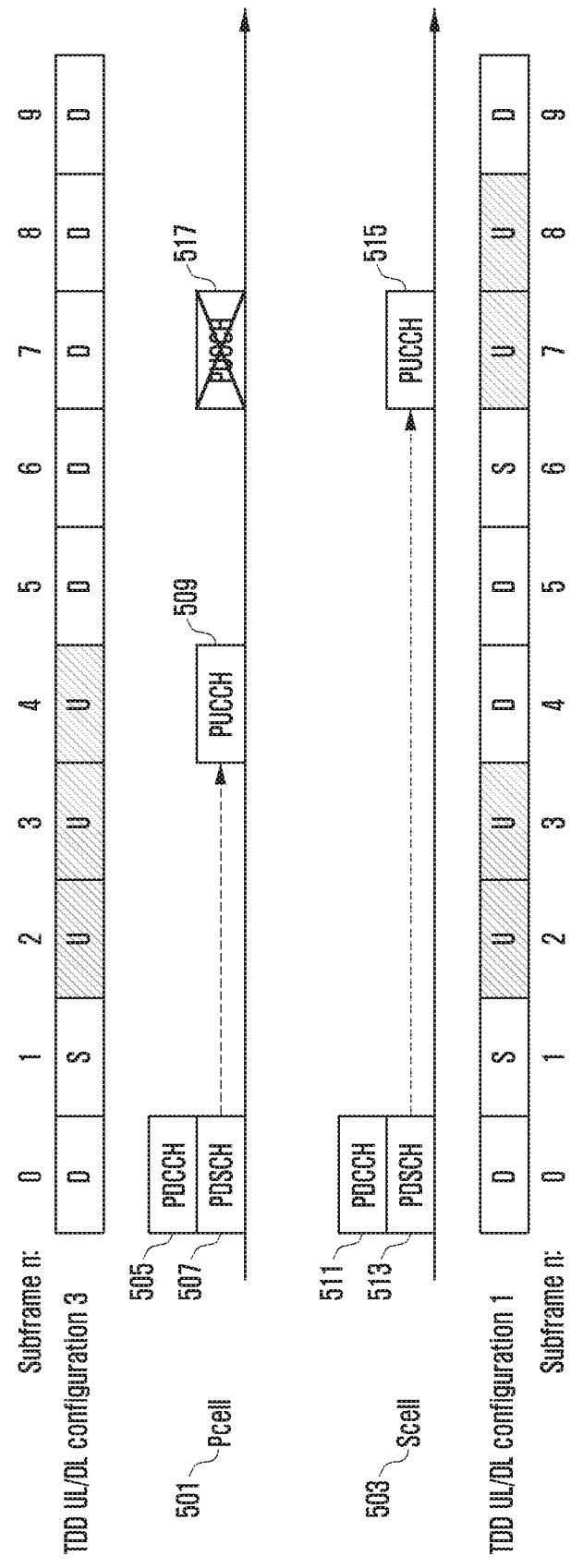
FIG. 5 is a diagram illustrating a timing relationship among physical channels for use in a case where TDD uplink-downlink configurations of aggregated carriers differ from each other according to an exemplary embodiment of the present invention.

FIG. 5 is a diagram illustrating a timing relationship among physical channels for use in a case where TDD uplink-downlink configurations of aggregated carriers differ from each other according to an exemplary embodiment of the present invention. FIG. 5 is directed to an exemplary case where the PCell 501 is configured with the TDD uplink-downlink configuration #3 (TDD UL/DL configuration #3) while the SCell 503 is configured with the TDD uplink-downlink configuration #1 (TDD UL/DL configuration #1).

Referring to FIG. 5, the eNB transmits PDSCH 507 to be transmitted through PCell 501 and PDCCH 505 for scheduling the PDSCH 507 at the subframe #0. The transmission timing of the HARQ ACK/NACK corresponding to the PDSCH 507 becomes the subframe #4 509 according to the timing relationship defined in the TDD uplink-downlink configuration #3. Accordingly, the UE transmits the HARQ ACK/NACK corresponding to the PDSCH 507 at the subframe #4 509 through the Pcell 501.

The eNB also transmits the PDSCH 513 to be transmitted through the SCell 503 and the PDCCH 511 for scheduling the PDSCH 513 at the subframe #0. At this time, the transmission timing of the HARQ ACK/NACK corresponding to the PDSCH 513 becomes the subframe #7 515 according to the timing relationship defined in the TDD uplink-downlink configuration #1. However, since the subframe #7 517 carrying the HARQ ACK/NACK is a Down-Link (DL) subframe in view of the PCell, it is not possible to transmit an uplink signal.

In order to address this problem, an exemplary embodiment of the present invention proposes the following rules. The rules can be commonly applied to both the cross carrier scheduling and self-scheduling.

Rule 1: The HARQ ACK/NACK transmission timing of the UE in a PCell is fixed regardless of whether the carrier aggregation is applied or not.

Rule 2: The transmission timings of the HARQ ACK/NACK corresponding to the PDSCH to be transmitted through the PCell and the PDSCH to be transmitted through the SCell are identical with each other.

Rule 3: The transmission timing n' of the HARQ ACK/NACK corresponding to the PDSCH transmitted at an $n^{th}$ subframe is equal to or greater than the transmission timing m' of the HARQ ACK/NACK corresponding to the PDSCH transmitted at an $m^{th}$ subframe (m<n, m'≤n'). The UE transmits the HARQ ACK/NACK at the UpLink (UL) subframe of a PCell among the subframes satisfying the relationship n'=n+k and m'=m+k (k≥4) after the receipt of the PDSCH. Here, k is set to a value equal to or greater than 4 in consideration of the PDSCH reception processing time and HARQ ACK/NACK transmission processing time.

Rule 4: The transmission timings of the HARQ ACK/NACK corresponding to the PDSCH transmitted at each DL subframe are distributed in the UL subframe as equally as possible.

Hereinafter, a description is made of a method for defining a timing relationship among the PDCCH, PDSCH, and uplink HARQ ACK/NACK that are related to the downlink data transmission. The present invention can be applied without any restriction on the number of component carriers to be aggregated for securing a broadband resource.

The first to third exemplary embodiments are directed to the case where the number of UL subframes according to the TDD uplink-downlink configuration of the PCell is greater than the number of UL subframes according to the TDD uplink-downlink configuration of the SCell. Also, it is assumed that, if the SCell is at an UL subframe, the PCell is also at an UL subframe at the same timing. That is, in view of an UL subframe, the position of the UL subframe in the PCell is always super set as compared to the UL subframe in the SCell The fourth exemplary embodiment is directed to the case where any of the above restrictions is not applied in the TDD uplink-downlink configurations of the PCell and SCell.

First Exemplary Embodiment

The first exemplary embodiment is directed to the case where the TDD uplink-downlink configurations of the aggregated carriers differ from each other in the TDD wireless communication system securing broadband resources through carrier aggregation. The timing relationship among the PDCCH, PDSCH, and PUCCH for transmitting uplink HARQ ACK/NACK that are related to downlink data transmission is described in association with rules 1 to 3.

Figure 6:
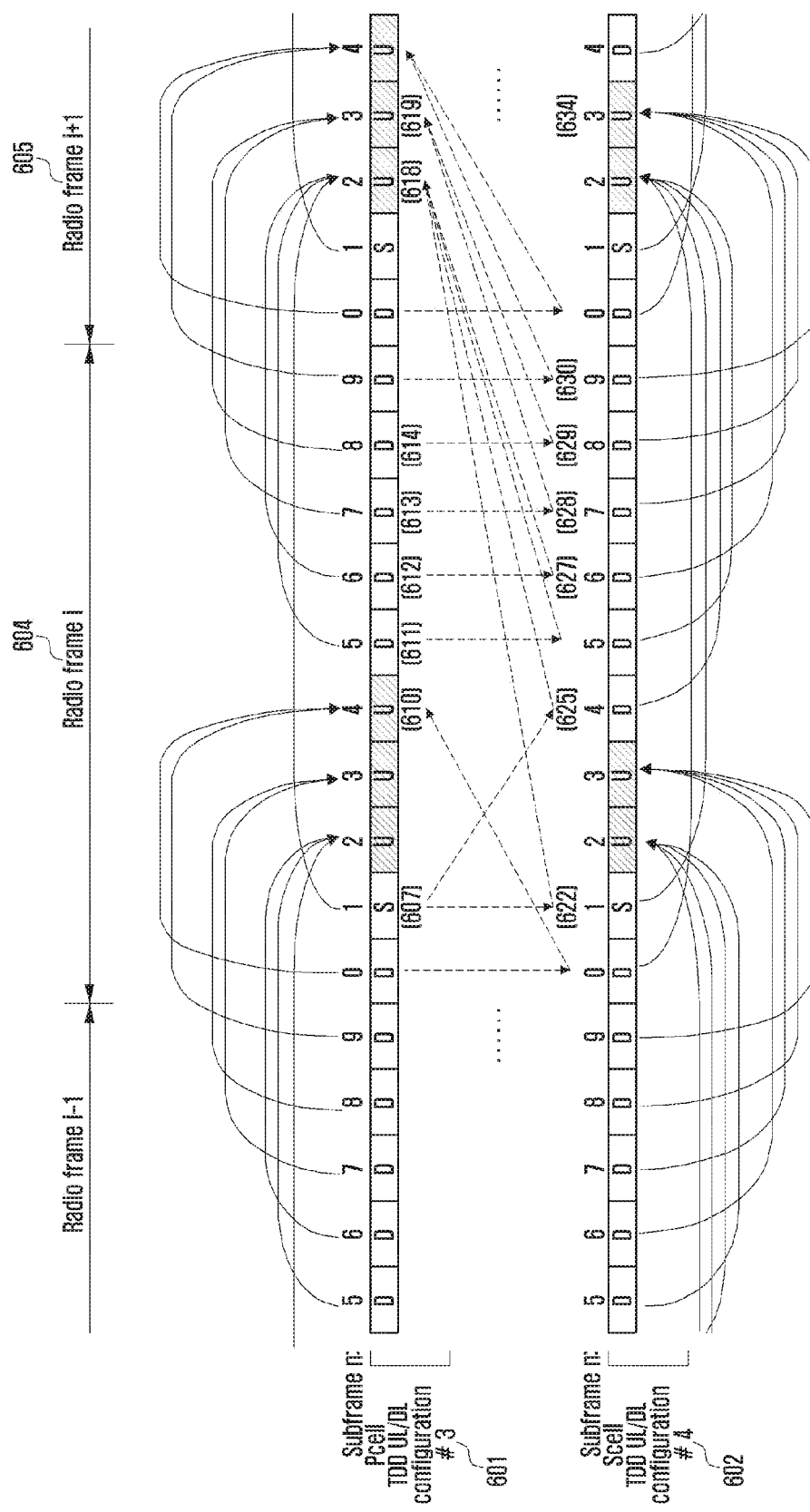
FIG. 6 is a diagram illustrating a timing relationship between a PDSCH and an uplink HARQ ACK/NACK according to a first exemplary embodiment of the present invention.

FIG. 6 is a diagram illustrating a timing relationship between a PDSCH and an uplink HARQ ACK/NACK according to a first exemplary embodiment of the present invention. FIG. 6 is directed to an exemplary case where the PCell is configured with the TDD uplink-downlink configuration #3 601 and the SCell is configuration with the TDD uplink-downlink configuration #4 602 in the TDD system operating on the component carriers aggregated. Here, 'D' denotes a DL subframe, 'U' denotes an UL subframe, and 'S' denotes a special subframe.

Referring to FIG. 6, the timing relationship among PDCCH, PDSCH, and PUSCH for PCell that is defined in the legacy LTE system and the timing relationship among PDCCH, PDSCH, and PUSCH for SCell that is defined in the legacy LTE system are expressed using solid line arrows. The timing relationships for the PCell and SCell that are expressed with the solid line arrows follow the timing relationships defined in the TDD uplink-downlink configurations #3 and #4, respectively.

In a case where the timing relationship is defined so as to transmit x (x>0) HARQ ACK/NACK is transmitted at a UL subframe, the UE transmits up to x HARQ ACK/NACK in the PUCCH at the UL subframe. If the UE does not schedule the PDSCH for the UE at some DL subframes corresponding to the UL subframe, or if the UE fails to receive the PDSCH transmitted by the eNB, the PUSCH carries y (y<x) HARQ ACK/NACK.

The start point of each solid line arrow denotes the DL subframe carrying the PDCCH and PDSCH. The end point of each solid line arrow denotes the UL subframe carrying the PUSCH. For example, the HARQ ACK/NACKs corresponding to the respective PDSCHs transmitted at subframe #7 613 and subframe #8 614 of $i^{th}$ subframe 604 of the PCell are formatted into the PUCCH transmitted at the subframe #3 619 of $(i+1)^{th}$ radio frame 605 of the PCell.

The transmission timing of the PUSCH carrying the HARQ ACK/NACKs corresponding to the PDSCHs transmitted at the subframes #6 627, subframe #7 628, subframe #8 629, and subframe #9 630 follows the timing relationship defined in the TDD uplink-downlink configuration #4 so as to be transmitted at the subframe #3 634 of the $(i+1)^{th}$ radio frame 605. However, since the PUSCH can be transmitted through the PCell, the HARQ ACK/NACKs corresponding to the PDSCHs transmitted at the subframes #6 627, subframe #7 628, subframe #8 629, and subframe #9 630 of the $i^{th}$ radio frame 604 are transmitted at the subframe #3 619 of the PCell.

However, if following the timing relationships of the LTE system that are defined for the respective PCell and SCell, although the PDSCH is transmitted through the PCell and SCell at the same timing, the transmission timing of the HARQ ACK/NACK corresponding to the PDSCH of the PCell and the transmission timing of the HARQ ACK/NACK corresponding to PDSCH of the SCell differ from each other so as to increase system operation complexity and degrade the efficiency. For example, the HARQ ACK/NACK corresponding to the PDSCH transmitted at the subframe #6 612 of the $i^{th}$ radio frame of the PCell is transmitted at the subframe #2 of $(i+1)^{th}$ radio frame of the PCell. However, the HARQ ACK/NACK corresponding to the PDSCH transmitted at the subframe #6 of the $i^{th}$ radio frame which is identical with the PDSCH of the PCell in transmission timing is transmitted at the subframe #3 619 of the PCell which corresponds to the subframe #3 634 of the $(i+1)^{th}$ radio frame.

In order to address this problem, the HARQ ACK/NACK transmission timing of the UE operating on the aggregated carriers is determined according to the above described rules 1 and 2, which are repeated below.

Rule 1: The HARQ ACK/NACK transmission timing of the UE in the PCell is fixed regardless of whether the carrier aggregation is applied or not.

Rule 2: The transmission timings of the HARQ ACK/NACK corresponding to the PDSCH to be transmitted through the PCell and the PDSCH to be transmitted through the SCell are identical with each other.

Rule 1 is for the PCell to follow the HARQ ACK/NACK transmission timing as indicated in the TDD uplink-downlink configurations specified in LTE. Rule 2 is to follow the HARQ ACK/NACK transmission timing of the PCell aggregated with the SCell as the HARQ ACK/NACK transmission timing corresponding to the PDSCH transmitted through the SCell regardless of the TDD uplink-downlink configuration of the SCell.

There may be no PCell's HARQ ACK/NACK transmission timing to reference for applying rule 2 to a certain DL subframe of the SCell. In the exemplary case of FIG. 6 the subframe #4 625 of the SCell is the DL subframe, the subframe #4 of the PCell at the same timing is the UL subframe. Accordingly, the transmission timing of the HARQ ACK/NACK corresponding to the PDSCH transmitted at the subframe #4 of the second cell cannot be determined by referencing the subframe #4 of the PCell. Therefore, the transmission timing of the HARQ ACK/NACK corresponding to the DL subframe of the SCell is newly defined by applying rule 3, which is repeated below.

Rule 3: The transmission timing n' of the HARQ ACK/NACK corresponding to the PDSCH transmitted at an $n^{th}$ subframe is equal to or greater than the transmission timing m' of the HARQ ACK/NACK corresponding to the PDSCH transmitted at an $m^{th}$ subframe (m<n, m'≤n'). The UE transmits the HARQ ACK/NACK at the UL subframe of a PCell among the subframes satisfying the relationship n'=n+k and m'=m+k (k≥4) after the receipt of the PDSCH. Here, k is set to a value equal to or greater than 4 in consideration of the PDSCH reception processing time and HARQ ACK/NACK transmission processing time.

With rule 3, the transmission timing of the HARQ ACK/NACK corresponding to the PDSCH transmitted at subframe #4 625 of $i^{th}$ subframe through the SCell is determined by referencing the transmission timing of the HARQ ACK/NACK corresponding to the subframe #1 607 and subframe #5 611 of the PCell that are DL subframes closest to the subframe #4 back and forth. The transmission timing of the HARQ ACK/NACK corresponding to the subframe #1 607 of the PCell becomes the subframe #2 618 of $(i+1)^{th}$ subframe, and the transmission timing of the HARQ ACK/NACK corresponding to the subframe #5 611 becomes the subframe #2 618 of $(i+1)^{th}$ subframe too. The transmission timing of the HARQ ACK/NACK corresponding to the PDSCH transmitted at the subframe #4 625 of $i^{th}$ radio frame that satisfies rule 3 in the SCell becomes the subframe #2 618 of the $(i+1)^{th}$ radio frame. In a case where the PDSCH to be transmitted at the subframe #4 625 of the SCell is cross-carrier scheduled in the PCell, the PDCCH is transmitted at the subframe #1 607 as the DL subframe of the PCell which is closest to the subframe #4 625. The PDCCH carried in the subframe #1 607 of the PCell includes an indicator for indicating whether the scheduling is of the PDSCH carried at the subframe #1 622 of the second cell or the PDSCH carried in the subframe #4 of the SCell.

Rule 3 can be modified as follows.

The subframe of the PCell is configured as a UL subframe at the timing when the PDSCH of the SCell is transmitted, the HARQ ACK/NACK corresponding to the PDSCH of the SCell is transmitted through the PCell according to the HARQ ACK/NACK timing defined in the TDD uplink-downlink configuration of the SCell. In this case, the subframe of the PCell at the transmission timing of the HARQ ACK/NACK is an uplink subframe.

If rules 1, 2, and 3 are applied synthetically, the transmission timing of the HARQ ACK/NACK corresponding to the PDSCH of the SCell can be configured as expressed by the dotted line arrows in FIG. 6 as proposed in the present exemplary embodiment.

While FIG. 6 is directed to the case where the cross-carrier scheduling is applied, the present invention is not limited thereto. By applying rules 1, 2, and 3 synthetically, it is possible to determine the transmission timing of the HARQ ACK/NACK in the self-scheduling mode as in the cross carrier scheduling. In the exemplary case of FIG. 6, the dotted link arrow starting at a D or S subframe of the PCell and ending at a D or S subframe of the SCell expresses the cross carrier scheduling operation in which the PDCCH transmitted at the D or S subframe of the PCell schedules the PDSCH to be transmitted at the D or S subframe of the SCell. Also, the dotted line arrows starting at the D or S subframe of the SCell and ending at an U subframe of the PCell expresses an operation in which the HARQ ACK/NACK corresponding to the PDSCH transmitted at the D or S subframe of the SCell is transmitted at the U subframe of the PCell.

For example, if the PDCCH is transmitted at the subframe #1 of the $i^{th}$ radio frame of the PCell to cross-carrier schedule the SCell, the PDSCH is transmitted at the subframe #1 622 of the $i^{th}$ radio frame of the SCell, and the HARQ ACK/NACK corresponding to the PDSCH of the SCell is transmitted at the subframe #2 618 of the $(i+1)^{th}$ radio frame of the PCell according to the transmission timing of the HARQ ACK/NACK corresponding to the subframe #1 607 of the PCell according to rule 2.

If the PDCCH transmitted at the subframe #1 607 of the $i^{th}$ radio frame of the PCell is cross-carrier scheduling the PDSCH to be transmitted at the subframe #4 625 of the $i^{th}$ radio frame of the SCell, the HARQ ACK/NACK corresponding to the PDSCH of the SCell is transmitted at the subframe #2 618 of the $(i+1)^{th}$ radio frame of the PCell. In this case, although the subframe #4 625 of the SCell is a DL subframe, the subframe #4 610 of the PCell at the same timing is a UL subframe. Accordingly, the PDCCH for cross-carrier scheduling the PDSCH to be transmitted at the subframe #4 625 of the SCell is transmitted at the subframe #1 607 as a DL subframe of the PCell closest to the subframe #4 625. The transmission timing of the HARQ ACK/NACK corresponding to the PDSCH to be transmitted through the PCell follows the HARQ ACK/NACK transmission timing defined in the TDD uplink-downlink configuration #3 predefined according to rule 1.

The HARQ ACK/NACK transmission timing according to the first exemplary embodiment can be summarized as shown in Table 4. If the PDSCH transmitted by the eNB at $(n-j)^{th}$ subframe is received, the UE transmits an uplink HARQ ACK/NACK corresponding to the PDSCH at the $n^{th}$ subframe. Here, j is an element of a set J which is defined as shown in Table 4. Table 4 is directed to the case where the PCell is configured with the TDD uplink-downlink configuration #3, the SCell is configured with the TDD uplink-downlink configuration #4, and the HARQ ACK/NACKs corresponding to the PDSCHs transmitted through the PCell and SCell are transmitted through the PCell.

TABLE 4

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 3 | — | — | 7, 6, 11 | 6, 5 | 5, 4 | — | — | — | — | — |
| 4 | — | — | 7, 6, 8, 11 | 6, 5 | 5, 4 | — | — | — | — | — |

Second Exemplary Embodiment

The second exemplary embodiment is directed to the case where the timing relationship among PDCCH, PDSCH, and PUCCH carrying the uplink HARQ ACK/NACK that are related to the downlink data transmission with rules 1 to 4 in the TDD wireless communication system securing broadband resource through carrier aggregation, especially when the TDD uplink-downlink configurations of the carriers differ from each other.

Figure 7:
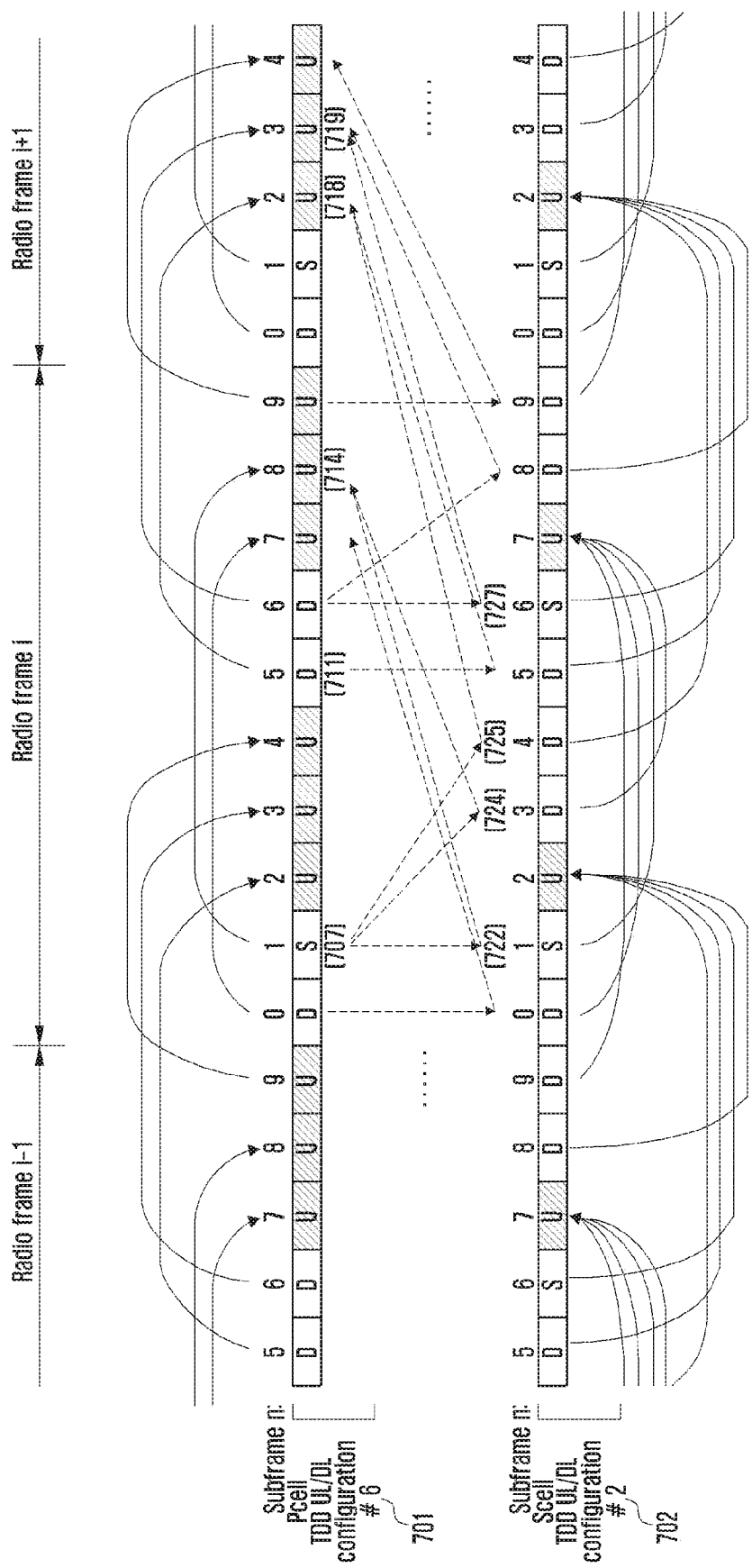
FIG. 7 is a diagram illustrating a timing relationship between a PDSCH and an uplink HARQ ACK/NACK according to a second exemplary embodiment of the present invention.

FIG. 7 is directed to the TDD system operating with two aggregated component carriers in which the PCell 701 is configured with the TDD uplink-downlink configuration #6 and the SCell 702 is configured with the TDD uplink-downlink configuration #2. The PCell's timing relationship among the PDCCH, PDSCH, and PUCCH that is defined in the legacy LTE system and the SCell's timing relationship among the PDCCH, PDSCH, and PUCCH that is defined in the legacy LTE system are expressed using solid link arrows. The start point of each solid line arrow denotes the DL subframe carrying the PDCCH and PDSCH, and the end point of each solid link arrow denotes the UL subframe carrying the PUCCH.

FIG. 7 is a diagram illustrating a timing relationship between PDSCH and an uplink HARQ ACK/NACK according to a second exemplary embodiment of the present invention.

Referring to FIG. 7, the transmission timing of the HARQ ACK/NACK corresponding to the PDSCH of the SCell is expressed with a dotted link arrow. Although the description is directed to the case of using the cross carrier scheduling, the present invention is not limited thereto. That is, a system operating with the self-scheduling can also determine the HARQ ACK/NACK transmission timing in the same manner as the cross carrier scheduling.

Here, the dotted link arrows starting at a D or S subframe of the PCell and ending at a D or S subframe of the SCell expresses the cross carrier scheduling operation in which the PDCCH transmitted at the D or S subframe of the PCell schedules the PDSCH to be transmitted at the D or S subframe of the SCell. Also, the dotted line arrows starting at the D or S subframe of the SCell and ending at a U subframe of the PCell expresses an operation in which the HARQ ACK/NACK corresponding to the PDSCH transmitted at the D or S subframe of the SCell is transmitted at the U subframe of the PCell.

In FIG. 7, the PCell follows the HARQ ACK/NACK transmission timing defined in the TDD uplink-downlink configuration #6 according to rule 1 regardless of the use of carrier aggregation. The transmission timing of the HARQ ACK/NACK corresponding to the PDSCH transmitted through the SCell follows the HARQ ACK/NACK transmission timing of the PCell aggregated with the SCell regardless of the TDD uplink-downlink configuration of the SCell according to rule 2.

If the PDCCH is transmitted at the subframe #1 of $i^{th}$ radio frame of the PCell to cross-carrier schedule the SCell, the PDSCH of the SCell is transmitted at the subframe #1 722 of the $i^{th}$ radio frame. The HARQ ACK/NACK corresponding to the PDSCH of the SCell is transmitted at the subframe #8 714 of the $i^{th}$ radio frame of the PCell according to the transmission timing of the HARQ ACK/NACK corresponding to the subframe #1 707 of the PCell according to rule 2.

The PDCCH transmitted at the subframe #1 of the $i^{th}$ radio frame of PCell is cross-carrier scheduling the PDSCH to be transmitted at the subframe #3 724 of the $i^{th}$ radio frame, the HARQ ACK/NACK corresponding to the PDSCH of the SCell may be transmitted earlier than the subframe #8 714 as the transmission timing of the HARQ ACK/NACK corresponding to the PDSCH to be transmitted at the subframe #1 722 of the second cell as DL subframe right before according to rule 3. Accordingly, the HARQ ACK/NACK corresponding to the PDSCH transmitted at the subframe #3 724 of the $i^{th}$ radio frame of the SCell is transmitted at the subframe #8 714 of the $i^{th}$ subframe of the PCell.

The PDCCH transmitted at the subframe #1 707 of the $i^{th}$ radio frame of the Pcell. The PDCCH transmitted at the subframe #1 707 of the $i^{th}$ radio frame of the PCell carries the cross carrier scheduling information for the PDSCH to be transmitted at the subframe #4 of the $i^{th}$ radio frame. The HARQ ACK/NACK corresponding to the PDSCH of the SCell is transmitted at the subframe #8 of the $(i+1)^{th}$ radio frame of the PCell since it cannot precede the subframe #8 714 as the transmission timing of the HARQ ACK/NACK corresponding to the PDSCH transmitted at the subframe #3 724 of the second cell as the DL subframe right before according to rule 3.

The PDCCH is transmitted at the subframe #5 711 of the $i^{th}$ radio frame of the PCell to cross-carrier schedule the SCell, the PDSCH is transmitted at the subframe #5 of the $i^{th}$ radio frame of the second cell. The HARQ ACK/NACK corresponding to the PDSCH of the SCell is transmitted at the subframe #2 718 of the $(i+1)^{th}$ radio frame of the PCell according to the transmission timing of the HARQ ACK/NACK corresponding to the subframe #5 711 of the PCell as specified in rule 2.

If the PDCCH is transmitted at the subframe #6 of the $i^{th}$ radio frame of the PCell to cross-carrier schedule the SCell, the PDSCH is transmitted at the subframe #6 727 of the $i^{th}$ radio frame through the SCell. The HARQ ACK/NACK corresponding to the PDSCH of the SCell is transmitted at the subframe #3 719 of the $(i+1)^{th}$ radio frame of the PCell according to the transmission timing of the HARQ ACK/NACK corresponding to the subframe #5 711 of the PCell as specified in rule 2.

The PDCCH transmitted at the subframe #6 of the $i^{th}$ radio frame of the PCell carries the cross scheduling information for the PDSCH to be transmitted at the subframe #8 of the $i^{th}$ radio frame of the SCell. The HARQ ACK/NACK corresponding to the PDSCH of the SCell is transmitted at the subframe #3 of the $(i+1)^{th}$ radio frame of the PCell since it cannot precede the subframe #3 719 as the transmission timing of the HARQ ACK/NACK corresponding to the PDSCH transmitted at the subframe #6 727 of the SCell as the DL subframe right before as specified in rule 3.

Once the HARQ ACK/NACK transmission timing is defined as above, the numbers of HARQ ACK/NACKs corresponding to the PDSCHs of the SCell that are transmitted at UL subframes of the PCell has the relationship of (UL subframe #2:UL subframe #3:UL subframe #4:UL subframe #7:UL subframe #8)=(1:2:1:1:3) such that the number of HARQ ACK/NACKs transmitted at the UL subframe #8 is relatively large, resulting in an inequality. This causes degradation of the resource utilization efficiency for the HARQ ACK/NACK transmission.

In order to address this problem, the HARQ ACK/NACK timing is determined such that the HARQ ACK/NACK transmission timings are distributed at the UL subframes of a radio frame as equally as possible with rule 4 in addition to rules 1 to 3.

Rule 4: The transmission timings of the HARQ ACK/NACKs corresponding to the PDSCHs transmitted at the DL subframes are distributed at the UL subframes as equally as possible.

By adding rule 4 to the scheduling method, it is possible to avoid an excessive increase of the number of HARQ ACK/NACKs transmitted at a certain subframe. That is, the HARQ ACK/NACK corresponding to the PDSCH transmitted at the subframe #4 725 of the $i^{th}$ radio frame of the SCell can be transmitted at the subframe #2 718 of the $(i+1)^{th}$ radio frame of the PCell.

By defining the HARQ transmission timing as described above, the distribution of the HARQ ACK/NACKs corresponding to the PDSCHs transmitted at UL subframes of the PCell and the SCell shows the relationship of (UL subframe #2:UL subframe #3: subframe #4:UL subframe #7:UL subframe #8)=(2:2:1:1:2) distributed as equally as possible. As shown in FIG. 7, the numbers of the dotted link arrows arriving at the UL subframes of the PCell are equal to each other. Also, the distribution of the number of the HARQ ACK/NACKs corresponding to the PDSCHs transmitted in view of UL subframes of the PCell has the relationship of (UL subframe #2:UL subframe #3:UL subframe #4:UL subframe #7:UL subframe #8)=(1:1:1:1:1).

Accordingly, the total distribution of the numbers of HARQ ACK/NACKs corresponding to the PDSCHs transmitted at the PCell and SCell in view of each UL subframe of the PCell has the relationship of (UL subframe #2:UL subframe #3:UL subframe #4:UL subframe #7:UL subframe #8)=(3:3:2:2:3) distributed as equally as possible.

The HARQ ACK/NACK transmission timings according to the second exemplary embodiment can be summarized as shown in Table 5. If the PDSCH transmitted by the eNB at the $(n-j)^{th}$ subframe, the UE transmits the uplink HARQ ACK/NACK corresponding to the PDSCH at $n^{th}$ subframe. Here, j is an element of a set J which is defined as shown in Table 5. Table 5 is directed to the case where the PCell is configured with the TDD uplink-downlink configuration #6, the SCell is configured with the TDD uplink-downlink configuration #2, and the HARQ ACK/NACKs corresponding to the PDSCHs transmitted through the PCell and SCell are transmitted through the PCell.

TABLE 5

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 2 | — | — | 7, 8 | 5, 7 | 5 | — | — | 7 | 5, 7 | — |
| 6 | — | — | 7 | 7 | 5 | — | — | 7 | 7 | — |

Third Exemplary Embodiment

Figure 8:
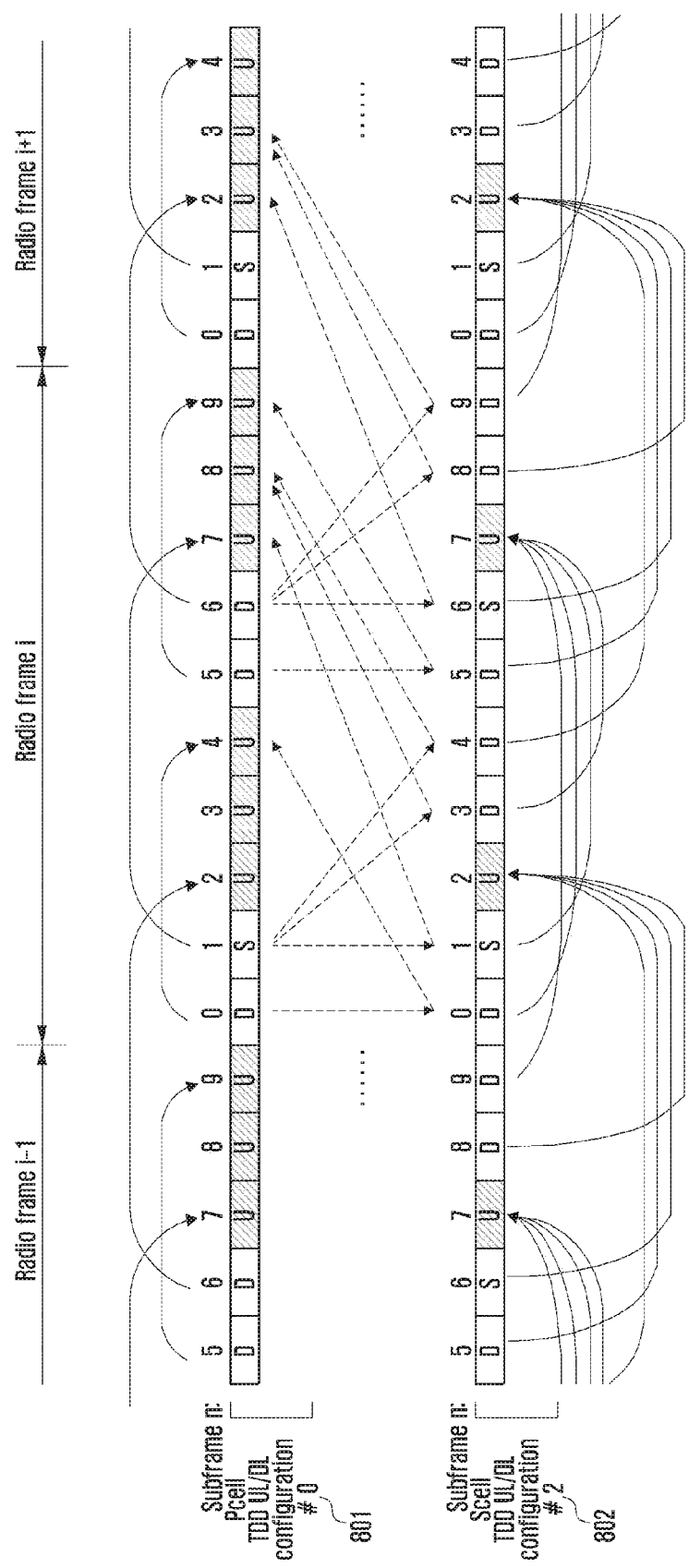
FIG. 8 is a diagram illustrating a timing relationship between a PDSCH and an uplink HARQ ACK/NACK according to a third exemplary embodiment of the present invention.

FIG. 8 is a diagram illustrating the timing relationship between the PDSCH and the uplink HARQ ACK/NACK according to the third exemplary embodiment of the present invention. FIG. 8 shows another exemplary embodiment to help understand the second exemplary embodiment more clearly, and is directed to the TDD system operating with two aggregated component carriers in which the PCell 801 is configured with the TDD uplink-downlink configuration #0 and the SCell 802 is configured with the TDD uplink-downlink configuration #2. By introducing rule 4 in addition to rules 1 to 3, the HARQ ACK/NACK transmission timings are distributed across the UL subframes within a radio frame as equally as possible.

In this case, the HARQ ACK/NACK transmission timing can be summarized as shown in Table 6. If the PDSCH transmitted by the eNB at the $(n-j)^{th}$ subframe, the UE transmits the uplink HARQ ACK/NACK corresponding to the PDSCH at $n^{th}$ subframe. Here, j is an element of a set J which is defined as shown in Table 6.

Table 6 is directed to the case where the PCell is configured with the TDD uplink-downlink configuration #0, the SCell is configured with the TDD uplink-downlink configuration #2, and the HARQ ACK/NACKs corresponding to the PDSCHs transmitted through the PCell and SCell are transmitted through the PCell.

TABLE 6

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 2 | — | — | 6 | 4, 5 | 4 | — | — | 6 | 4, 5 | 4 |

By defining the HARQ ACK/NACK transmission timing as described above, the distribution of the numbers of the HARQ ACK/NACKs corresponding to the PDSCHs transmitted through the SCell in view of the UL subframe of the PCell has the relationship of (UL subframe #2:UL subframe #3:UL subframe #4:UL subframe #7:UL subframe #8:UL subframe #9)=(1:2:1:1:2:1) distributed as equally as possible. As shown in FIG. 8, the numbers of the dotted link arrows arriving at the UL subframes of the PCell are equal to each other.

The distribution of the number of the HARQ ACK/NACKs corresponding to the PDSCHs transmitted in view of UL subframes of the PCell has the relationship of (UL subframe #2:UL subframe #3:UL subframe #4:UL subframe #7:UL subframe #8:UL subframe #9)=(1:0:1:1:0:1).

Accordingly, the total distribution of the numbers of HARQ ACK/NACKs corresponding to the PDSCHs transmitted at the PCell and SCell in view of UL subframes of the PCell has the relationship of (UL subframe #2:UL subframe #3:UL subframe #4:UL subframe #7:UL subframe #8:UL 9)=(2:2:2:2:2:2) distributed as equally as possible.

Figure 9:
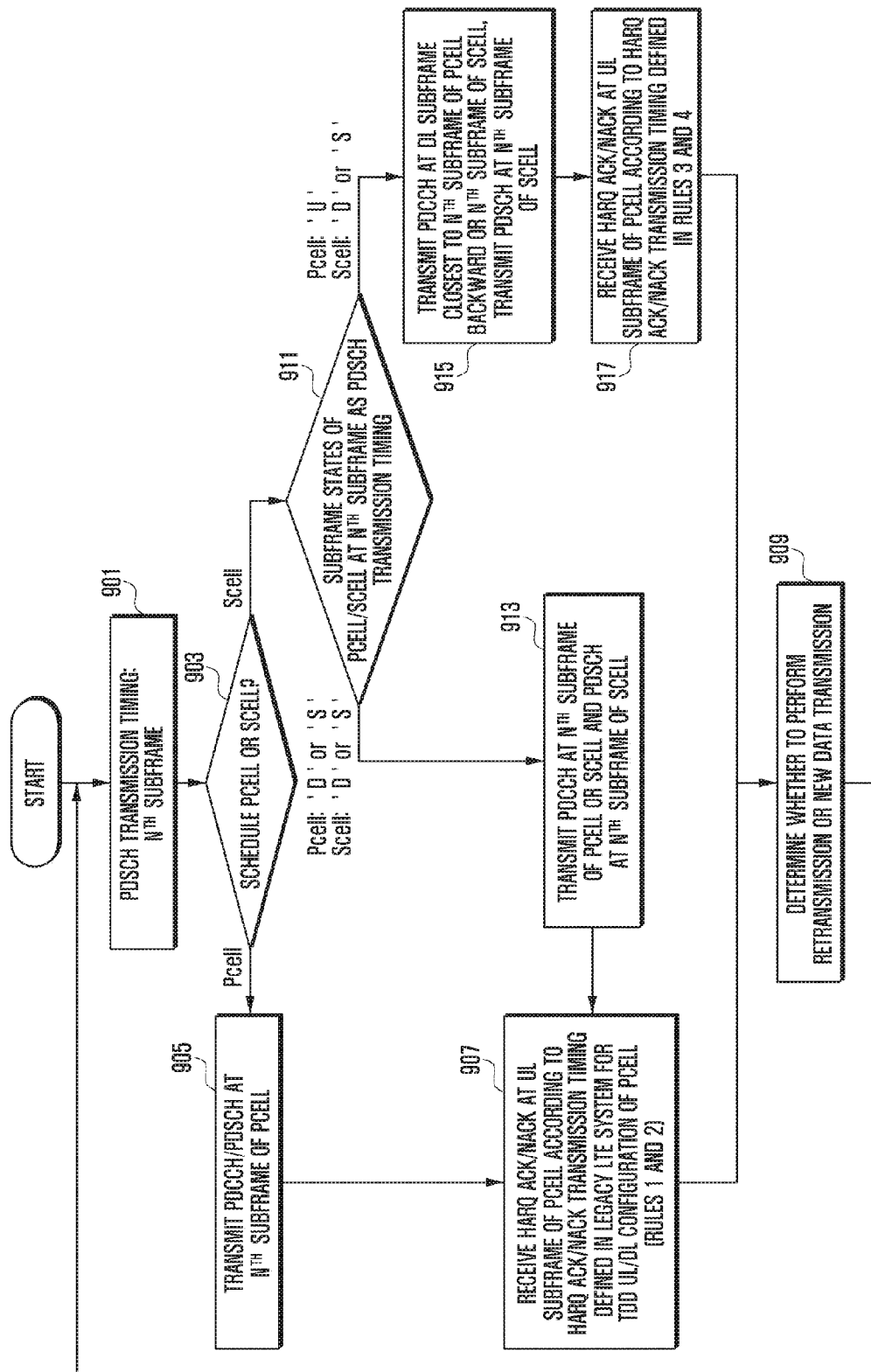
FIG. 9 is a flowchart illustrating an evolved Node B (eNB) procedure in a method according to any of the first to third exemplary embodiments of the present invention.

FIG. 9 is a flowchart illustrating an eNB procedure in a method according to any of the first to third exemplary embodiments of the present invention.

The operation of the eNB according to an exemplary embodiment of the present invention is summarized as follows. The method comprises a step of transmitting a downlink physical channel for at least one of the first cell (PCell) and the second cell (SCell) to the UE, a first reception step of receiving a physical uplink channel corresponding to the downlink physical channel of the first cell, and a second reception step of receiving a physical uplink channel for a downlink physical channel of the second cell according to the reception timing of the physical uplink channel of the first cell. In this case, the second reception step can follow rules 1 to 3 described above.

Referring to FIG. 9, a description is made of the eNB procedure according to an exemplary embodiment of the present invention in detail.

The eNB sets the transmission timing of PDSCH to $n^{th}$ subframe at step 901. Next, the eNB determines whether to transmit the PDSCH through a PCell, an SCell, or both the PCell and SCell, at step 903.

If it is determined to transmit the PDSCH through the PCell, the eNB transmits to the UE the PDSCH and PDCCH for scheduling the PDSCH at the $n^{th}$ subframe of the PCell at step 905. Next, the eNB receives a HARQ ACK/NACK corresponding to the PDSCH at a UL subframe of the PCell according to the HARQ ACK/NACK transmission timing defined for the legacy LTE system in the TDD uplink-downlink configuration in step 907 (rule 1). Next, the eNB determines whether to perform retransmission of old data or initial transmission of new data according to the received HARQ ACK/NACK at step 909. If the ACK is received, the eNB transmits the new data to the UE. Otherwise, if the NACK is received, the eNB retransmits the PDSCH.

If it is determined to transmit the PDSCH through the SCell at step 903, the eNB checks a subframe state of the PCell and SCell at the $n^{th}$ subframe as the PDSCH transmission timing at step 911.

If the PCell is in the state of a DL subframe or special subframe and if the SCell is in the state of the DL subframe or special subframe, the eNB transmits the PDCCH at the $n^{th}$ subframe of the PCell or SCell at step 913. The PDSCH is transmitted at the $n^{th}$ subframe. At this time, if the system is in self-scheduling mode, the eNB transmits the PDCCH at the $n^{th}$ subframe of the SCell. If the system is in cross-carrier scheduling mode, the eNB transmits the PDCCH at the $n^{th}$ subframe of the PCell. Next, the eNB performs a process for receiving the HARQ ACK/NACK corresponding to the PDSCH at step 907 (rules 1 and 2).

If the PCell is in the state of a UL subframe and if the SCell is in the state of a DL subframe or special subframe, the eNB transmits the PDCCH at the closest DL subframe before the $n^{th}$ subframe of the PCell at step 915. Or, the eNB transmits the PDCCH at the $n^{th}$ subframe of the SCell. Next, the eNB transmits the PDSCH at the $n^{th}$ subframe of the SCell and, if the system is in the cross carrier scheduling mode, the eNB transmits the PDCCH at the closest DL subframe before the $n^{th}$ subframe of the PCell. Afterward, the eNB receives the HARQ ACK/NACK at the UL subframe of the PCell according to the HARQ ACK/NACK transmission timing defined in rule 3 as described in the first exemplary embodiment and the HARQ ACK/NACK transmission timing defined in rules 3 and 4 as described in the second exemplary embodiment at step 917. Next, the eNB can determine whether to retransmit the PDSCH according to the received HARQ ACK/NACK at step 909. If the ACK is received, the eNB transmits new data to the UE. Otherwise, if the NACK is received, the eNB retransmits the PDSCH to the UE. Afterward, the procedure returns to step 901.

Although not depicted in FIG. 9, if the PDSCH is transmitted through both the PCell and SCell at step 903, the eNB's PDSCH transmission procedure in the PCell goes to step 905. Meanwhile, the eNB's PDSCH transmission procedure in the SCell goes to step 911.

Figure 10:
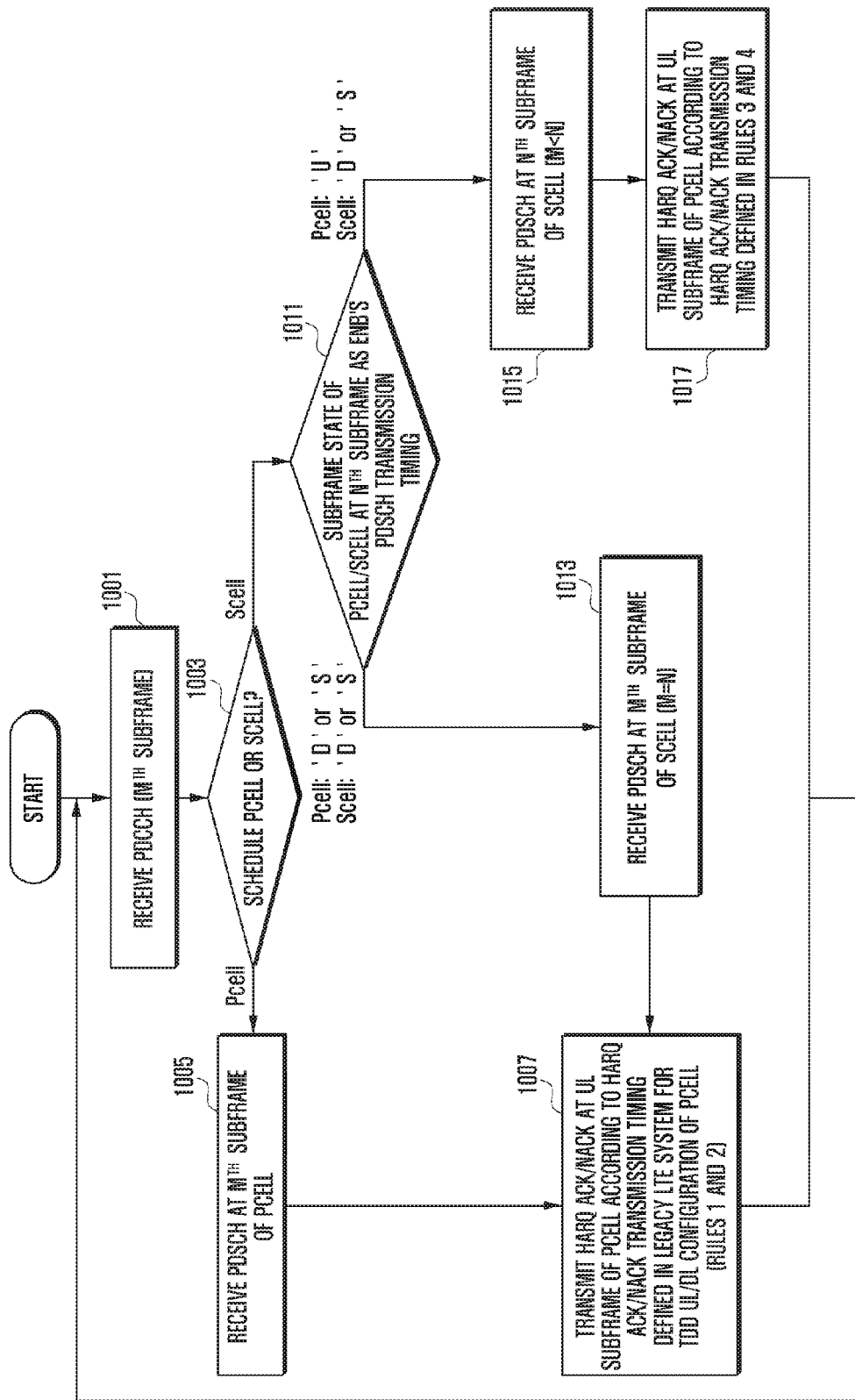
FIG. 10 is a flowchart illustrating a User Equipment (UE) procedure in a method according to any of the first to third exemplary embodiments of the present invention.

FIG. 10 is a flowchart illustrating a UE procedure in a method according to any of the first to third exemplary embodiments of the present invention.

The operation the UE according to an exemplary embodiment of the present invention is summarized as follows. The method comprises a step of receiving a downlink physical channel for at least one of the first and second cells from the eNB, a first transmission step of transmitting the uplink physical channel of the first cell at a predetermined timing, and a second transmission step of transmitting the uplink physical channel of the second cell according to the uplink physical channel transmission timing of the first cell. Here, the second transmission step can follow rules 1 to 3 described above.

A description is made of the UE procedure according to an exemplary embodiment of the present invention with reference to FIG. 10.

Referring to FIG. 10, the UE receives a PDCCH at the $m^{th}$ subframe from the eNB at step 1001. The UE is not aware of the timing and component carrier for PDCCH transmission of the eNB. Accordingly, the UE attempts to decode the PDCCH on all of the aggregated component carriers at every subframe. In more detail, the UE performs a Cyclic Redundancy Check (CRC) test with a unique UE IDentifier (ID) allocated to itself on the received PDCCH and, if the CRC test is passed, it is determined that the PDCCH is addressed to the UE.

The UE determines whether the received PDCCH is for scheduling the PDSCH of the PCell, the PDSCH of the SCell, or the PDSCHs of both the PCell and SCell at step 1003. If the received PDCCH is for scheduling the PDSCH of the PCell, the UE receives the PDSCH at the $m^{th}$ subframe of the PCell at step 1005. Next, the UE transmits the HARQ ACK/NACK corresponding to the PDSCH at the UL subframe of the PCell according to the HARQ ACK/NACK transmission timing defined for the legacy LTE system in the TDD uplink-downlink configuration at step 1007 (rule 1). Afterward, the procedure returns to step 1001.

If the received PDCCH is for scheduling the PDSCH of the SCell at step 1003, the UE checks the subframe state of the PCell and SCell at the $n^{th}$ subframe as the eNB's PDSCH transmission timing at step 1011. If the PCell is in the state of the DL subframe or special subframe and if the SCell is in the state of the DL subframe or special subframe, the UE receives the PDSCH at the $m^{th}$ subframe of the SCell at step 1013. This is the case of m=n such that the PDCCH and PDSCH are received at the same subframe. Afterward, the UE performs a process for transmitting the HARQ ACK/NACK corresponding to the PDSCH at step 1007 (rules 1 and 2).

If the PCell is in the state of a UL subframe and if the SCell is in the state of a DL subframe or special subframe at step 1011, the UE receives the PDSCH at the $n^{th}$ subframe of the SCell at step 1015. This is the case of m<n such that the PDSCH is received at a subframe located later than the subframe carrying the PDCCH. Afterward, the UE transmits the HARQ ACK/NACK corresponding to the PDSCH at the UL subframe of the PCell, according to the HARQ ACK/NACK transmission timing defined in rule 3 in a case of the first exemplary embodiment and the HARQ ACK/NACK transmission timing defined in rules 3 and 4 in a case of the second exemplary embodiment, at step 1017. Afterward, the procedure returns to step 1001.

Although not depicted in the drawing, if it is determined that the PDCCH received is for scheduling the PDSCHs of both the PCell and SCell at step 1003, the UE's PDSCH reception procedure in the PCell goes to step 1005. Meanwhile, the UE's PDSCH reception procedure in the SCell goes to step 1011.

The first to third exemplary embodiments are applied to the case where the number of UL subframes defined in the TDD uplink-downlink configuration of the PCell is greater than the number of UL subframes defined in the TDD uplink-downlink configuration of the SCell. If the SCell is in the state of a UL subframe at the same timing, the PCell should be in the UL subframe. That is, the position of the UL subframe of the PCell is always of a superset as compared to the UL subframe of the SCell in view of the UL subframe. Accordingly, when the UE transmits the HARQ ACK/NACK corresponding to the PDSCH of the SCell at the UL subframe of the PCell, it is possible to minimize delay. The combination of the TDD uplink-downlink configurations available for the PCell and SCell from the reference point of the TDD uplink-downlink configurations defined for the current LTE/LTE-A system can be summarized as shown in Table 7.

TABLE 7

| Case | Pcell | Scell |
|---|---|---|
| 1 | 0 | 1, 2, 3, 4, 5, 6 |
| 2 | 1 | 2, 4, 5 |
| 3 | 2 | 5 |
| 4 | 3 | 4, 5 |
| 5 | 4 | 5 |
| 6 | 5 | — |
| 7 | 6 | 1, 2, 3, 4, 5 |

In Table 7, if the PCell is configured with the TDD uplink-downlink configuration #6, the SCell can be configured with one of the TDD uplink-downlink configuration #1, TDD uplink-downlink configuration #2, TDD uplink-downlink configuration #3, TDD uplink-downlink configuration #4, and TDD uplink-downlink configuration #5. The first to third exemplary embodiments can be modified in various ways.

For example, the cross carrier scheduling can be allowed only when both the PCell and SCell are in the state of a DL subframe or special subframe at the same timing. That is, if the PCell is in the state of a UL subframe and the SCell is in the state of a DL subframe at a certain timing, the cross carrier scheduling is not permitted. Accordingly, the HARQ ACK/NACK transmission timing is determined according to rules 1 and 2 only.

For a modified example, if there is a plurality of subframes satisfying rule 3 in the first exemplary embodiment, the HARQ ACK/NACK transmission timing is determined as the subframe closest to the subframe carrying the PDSCH in the SCell, in addition to rule 3.

For another modified example, it is possible to restrict the combinations of the TDD uplink-downlink configurations that are available in the carrier aggregation mode according to the transmission period of the special subframe, with another condition in addition to the conditions of Table 7. That is, the TDD uplink-downlink configurations #0, #6, #1, and #2 having the special subframe transmission period of 5 ms are categorized into group #1, and the TDD uplink-downlink configurations #3, #4, and #5 having the special subframe transmission period of 10 ms are categorized into group #2. In each group, the HARQ ACK/NACK transmission timing can be defined under the conditions proposed in the description of Table 7 and rules defined in the first and second exemplary embodiments.

Fourth Exemplary Embodiment

Unlike the first to third exemplary embodiments, the fourth exemplary embodiment is directed to the case where the TDD uplink-downlink configurations of the PCell and SCell have no restriction.

A description is made of the operation according to the fourth exemplary embodiment adopting rule 5 in addition to rules 1 and 2.

Figure 11:
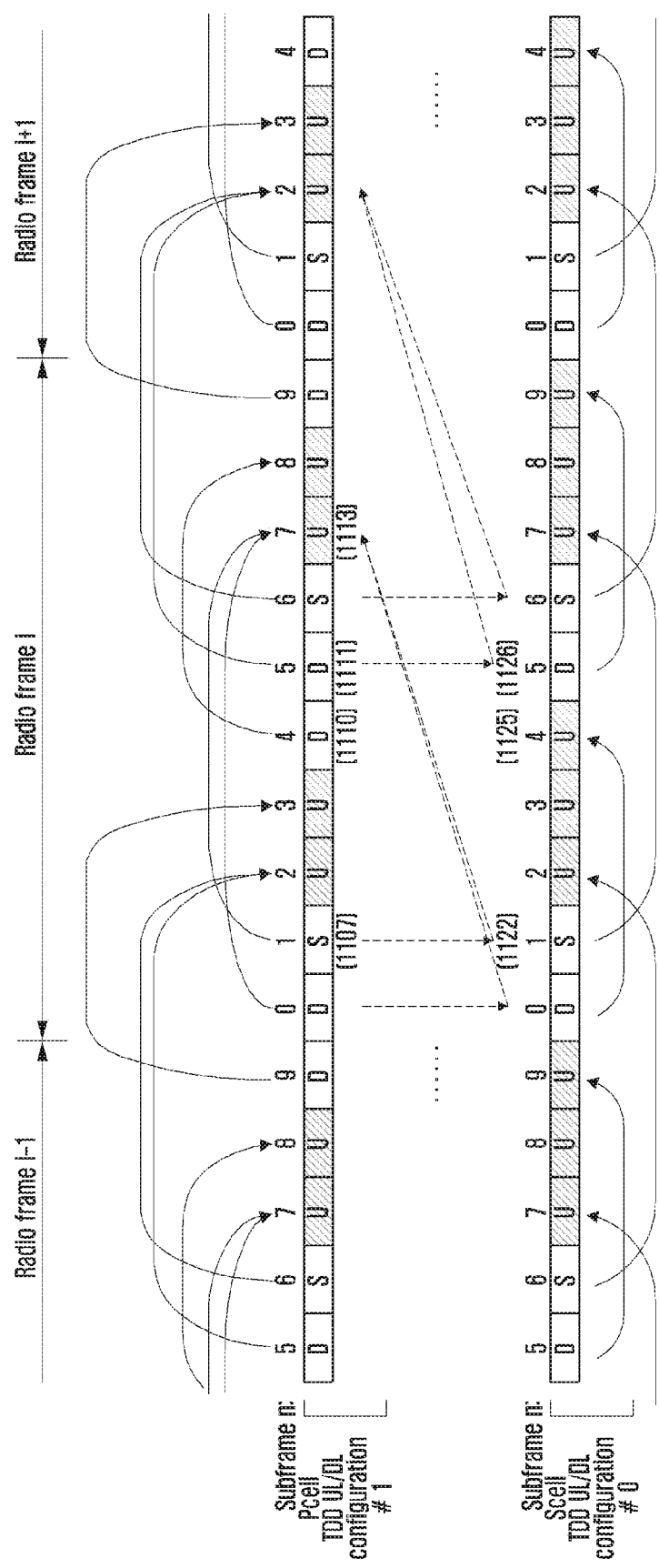
FIG. 11 is a diagram illustrating a timing relationship between a PDSCH and an uplink HARQ ACK/NACK according to a fourth exemplary embodiment of the present invention.

FIG. 11 is a diagram illustrating a timing relationship between a PDSCH and an uplink HARQ ACK/NACK according to a fourth exemplary embodiment of the present invention. FIG. 11 is directed to the TDD system operating with two aggregated component carriers in which the PCell is configured with the TDD uplink-downlink configuration #1 and the SCell is configured with the TDD uplink-downlink configuration #0. In FIG. 11, the timing relationship among PDCCH, PDSCH, and PUCCH in the PCell and the timing relationship among PDCCH, PDSCH, and PUCCH in the SCell that are defined for the legacy LTE system are expressed by solid line arrows. The start point of each solid line arrow denotes the DL subframe carrying PDCCH and PDSCH, and the end point of each solid line arrow denotes the UL subframe carrying PUCCH.

Referring to FIG. 11, the transmission timing of HARQ ACK/NACK corresponding to the PDSCH of the SCell according to the proposed invention is expressed as dotted arrow. Although FIG. 11 is directed to the case of adopting the cross carrier scheduling, this method can be applied for determining the HARQ ACK/NACK transmission timing in the case of adopting the self-scheduling too.

In the exemplary case of FIG. 11, the dotted link arrow starting at a D or S subframe of the PCell and ending at a D or S subframe of the SCell express the cross carrier scheduling operation in which the PDCCH transmitted at the D or S subframe of the PCell schedules the PDSCH to be transmitted at the D or S subframe of the SCell. Also, the dotted line arrow starting at the D or S subframe of the SCell and ending at a U subframe of the PCell expresses an operation in which the HARQ ACK/NACK corresponding to the PDSCH transmitted at the D or S subframe of the SCell is transmitted at U subframe of the PCell.

In FIG. 11, the PCell follows the HARQ ACK/NACK transmission timing according to the TDD uplink-downlink configuration #1 defined in the legacy LTE regardless of the use of carrier aggregation according to rule 1. The SCell follows the HARQ ACK/NACK transmission timing of the PCell aggregated with the SCell regardless of the TDD uplink-downlink configuration of the SCell according to rule 2.

In the exemplary case of FIG. 11, if the PDSCH is transmitted at the subframe #1 1107 of $i^{th}$ radio frame through the PCell to cross-carrier schedule the SCell, the PDSCH is transmitted at the subframe #1 1122 of the $i^{th}$ radio frame through the SCell. The HARQ ACK/NACK corresponding to the PDSCH of the SCell is transmitted at the subframe #7 1113 of the $i^{th}$ radio frame of the PCell according to the transmission timing of the HARQ ACK/NACK corresponding to the subframe #1 1107 of the PCell according to rule 2.

If the PDCCH is transmitted at the subframe #5 of the $i^{th}$ radio frame through the PCell to cross carrier schedule the SCell, the PDSCH is transmitted at the subframe #5 1126 of the $i^{th}$ radio frame of the SCell. The HARQ ACK/NACK corresponding to the PDSCH of the SCell is transmitted at the subframe #2 1118 of the $(i+1)^{th}$ radio frame through the PCell according to the transmission timing of the HARQ ACK/NACK corresponding to the subframe #5 1111 of the PCell according to rule 2.

In the exemplary case of FIG. 11, however, the PCell is in the state of a DL subframe and the SCell is in the state of a UL subframe at the subframe #4 1110 and 1125 of the $i^{th}$ radio frame at the same timing. Accordingly, the PDSCH as DL data of the SCell cannot be transmitted at the subframe #4 1125 of the SCell. This means that the cross carrier scheduling cannot operate at the corresponding subframe.

Rule 5: if the SCell is in the state of a UL subframe and the PCell is in the state of a DL subframe at the same timing, the PDSCH of the SCell cannot be cross-carrier scheduled at the corresponding subframe.

In this case, the PDCCH for scheduling PDSCH of the PCell and the PDSCH can be transmitted at the corresponding subframe #4 of the PCell. The HARQ ACK/NACK corresponding to the PDSCH of the PCell is transmitted at the subframe #8 of the PCell according to the conventional timing relationship of the HARQ of the PCell.

The HARQ ACK/NACK transmission timing according to the fourth exemplary embodiment can be summarized as shown in Table 8. If the PDSCH transmitted by the eNB at $(n-j)^{th}$ subframe is received, the UE transmits uplink HARQ ACK/NACK corresponding to the PDSCH at the $n^{th}$ subframe. Here, j is an element of a set J which is defined as shown in Table 8. Table 8 is directed to the case where the PCell is configured with the TDD uplink-downlink configuration #1, the SCell is configured with the TDD uplink-downlink configuration #0, and the HARQ ACK/NACKs corresponding to the PDSCHs transmitted through the PCell and SCell are transmitted through the PCell.

TABLE 8

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 1 | — | — | 7, 6 | 4 | — | — | — | 7, 6 | 4 | — |
| 0 | — | — | 7, 6 | — | — | — | — | 7, 6 | — | — |

The eNB procedure according to the fourth exemplary embodiment is performed as described with reference to FIG. 9 with the addition of rule 5. The UE procedure according to the fourth exemplary embodiment is performed as described with reference to FIG. 10 with the addition of rule 5.

Although the first to fourth exemplary embodiments are directed to the method for transmitting HARQ ACK/NACK in PUCCH, the present invention is not limited thereto. Even when transmitting the HARQ ACK/NACK in the PUSCH, the HARQ ACK/NACK is transmitted according to the timing relationship so as to maintain the consistency of HARQ ACK/NACK transmission timing. For example, in the exemplary case of FIG. 6, the HARQ ACK/NACK corresponding to the PDSCH transmitted at the subframe #9 630 of the $i^{th}$ radio frame of the SCell is transmitted at the subframe #3 of the $(i+1)^{th}$ radio frame according to the SCell's own timing relationship. In a case where the UE transmits PUSCH at the subframe #3 634 of the $(i+1)^{th}$ radio frame, however, the HARQ ACK/NACK can be transmitted in the PUSCH at the subframe #3 of the SCell. Even in this case, rule 2 is applied such that the PUCCH, or if PUSCH has been scheduled, the HARQ ACK/NACK can be transmitted in the PUSCH.

Typically in the legacy LTE and LTE-A systems, the radio resource for transmitting the HARQ ACK/NACK is calculated automatically from the Control Channel Element (CCE) of the PDCCH for scheduling the PDSCH corresponding to the HARQ ACK/NACK. The CCE is a unit of the PDCCH. One CCE is composed of total 36 Resource Elements (REs). The RE is a basic unit of radio resource of the LTE and LTE-A systems and is defined as a combination of a subcarrier in the frequency domain and an OFDM symbol in the time domain.

If one PDCCH is used for scheduling PDSCH to be transmitted at a plurality of subframes, it is possible to cross-carrier schedule the PDSCH to be transmitted at the subframe #1 622 of the SCell (hereinafter, referred to as PDSCH 1) and the PDSCH to be transmitted at the subframe #4 625 of the SCell (hereinafter, referred to as PDSCH 2) with one PDCCH transmitted at the subframe #1 676 of the PCell simultaneously. At this time, the transmission resource for the HARQ ACK/NACKs corresponding to the PDSCHs of the PCell and SCell should be defined, respectively.

In case that the transmission timing of the PDSCH 1 is earlier than that of the PDSCH 2, the transmission resource of the HARQ ACK/NACK corresponding to the PDSCH 1 is calculated from the CCE having the lowest index (n_CCE). Meanwhile, the transmission resource of the HARQ ACK/NACK corresponding to the PDSCH 2 is calculated from the CCE having the index of n_CCE+1.

Figure 12:
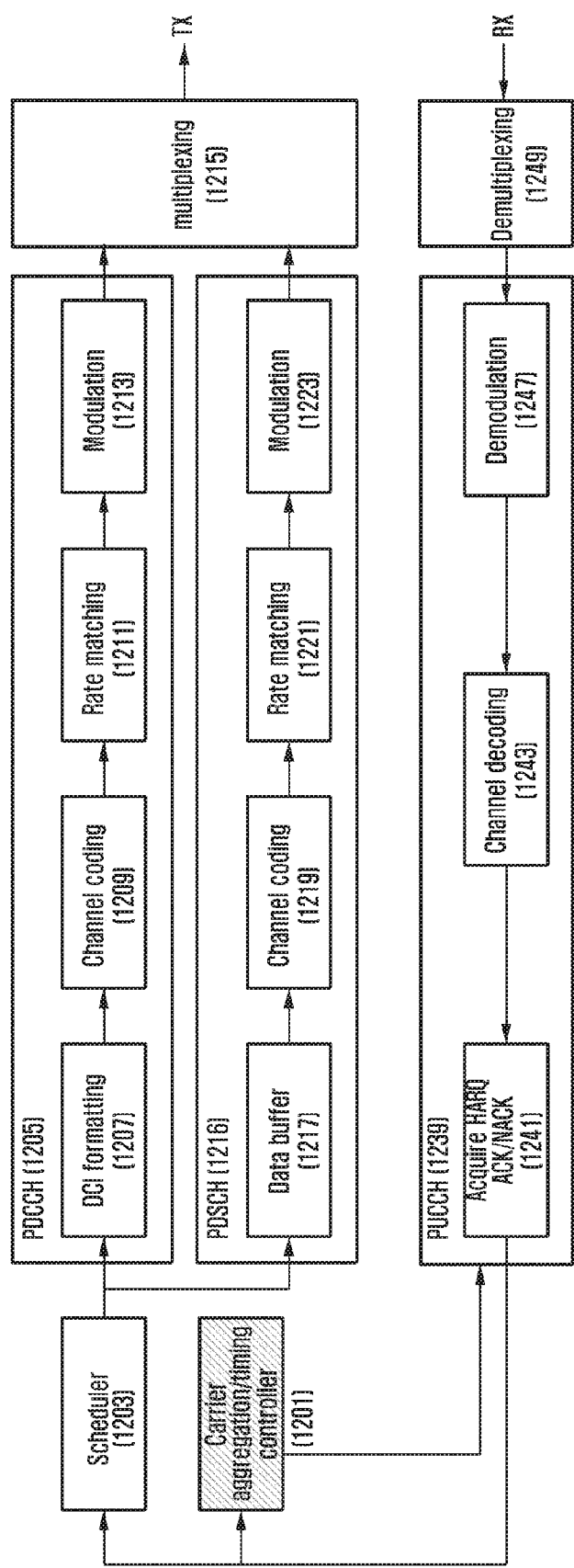
FIG. 12 is a block diagram illustrating a configuration of an eNB according to any of the first to fourth exemplary embodiments of the present invention.

FIG. 12 is a block diagram illustrating a configuration of an eNB according to any of the first to fourth exemplary embodiments of the present invention.

Referring to FIG. 12, the eNB includes a transmission part (TX) comprising a Carrier aggregation/timing controller 1201, a scheduler 1203, a PDCCH block 1205, a PDSCH block 1216, and a multiplexer 1215; and a reception part (RX) comprising a PUCCH block 1239 and a demultiplexer 1249. The PDCCH block 1205 of the transmission part includes a DCI formatter 1207, a channel coder 1209, a rate matcher 1211 and a modulator 1213; and the PDSCH block 1216 includes a data buffer 1217, a channel coder 1219, a rate matcher 1221, and a modulator 1223. The PUCCH block of the reception part includes a demodulator 1247, a channel decoder 1243, and an HARQ ACK/NACK acquirer 1241.

The carrier aggregation/timing controller 1201 determines the carrier aggregation scheme and the timing relationship among the physical channels for the UE to be scheduled by referencing the data amount to be transmitted to the UE and the resource amount available in the system and notifies the scheduler 1203 and the PUCCH block 1239 of the determination result. Here, the timing relationship is determined according to the method according to one of the above-described exemplary embodiments of the present invention.

The carrier aggregation/timing controller 1201 controls to transmit to the UE the downlink physical channels for at least one of the first and second cells. The carrier aggregation/timing controller 1201 controls to receive the uplink physical channel corresponding to the downlink physical channel at a predetermined timing through the first cell. The carrier aggregation/timing controller 1201 also control such that the uplink physical channel corresponding to the downlink physical channel of the second cell is received at the uplink physical channel reception timing of the first cell.

In this case, if the downlink physical channels about the first and second cells are transmitted to the UE at the same timing, the carrier aggregation/timing controller 1201 configures the uplink physical channel reception timing of the second cell to be identical with the uplink physical channel reception timing of the first cell. Meanwhile, if the downlink physical channels of the first and second cells are not transmitted at the same timing, the carrier aggregation/timing controller 1201 configures such that the uplink physical channel reception timing of the second cell is identical with the uplink physical channel reception timing corresponding to the downlink subframe of the first cell which is closest to the downlink physical channel reception timing of the second cell. In this case, the uplink physical channels for the first and second cells can be received as distributed across the uplink subframes as equally as possible.

In a case where the first cell is in the state of a DL subframe and the second cell is in the state of a UL subframe, the carrier aggregation/timing controller 1201 may not cross-carrier schedule the second cell at the corresponding timing.

The PDCCH block 1205 generates DCI by means of the DCI formatter 1207 under the control of the scheduler 1203. The DCI is channel-coded with the addition of error correction capability by means of the channel coder 1209 and then rate-matched to the resource amount to be mapped thereto by means of the rate matcher 1211. The rate-matched DCI is modulated by the modulator 1213 and multiplexed with other signals by the multiplexer 1215. The multiplexed signals are converted into OFDM signals so as to be transmitted to the UE.

The PDSCH block 1215 receives PDSCH data in the data buffer 1217 under the control of the scheduler 1203. The PDSCH data is channel-coded by means of the channel coder 1219 and then rate-matched to the resource amount to be mapped thereto by means of the rate matcher 1221. The rate-matched PDSCH data is modulated by the modulator 1223 and multiplexed with other signals by the multiplexer 1215. The multiplexed signals are converted into OFDM signals so as to be transmitted to the UE.

The PUCCH block 1239 of the receiver separates PUCCH signals from the received signal by means of the demultiplexer 1249 and the demodulator 1247 performs demodulation on the PUSCH signal. The PUCCH block 1239 decodes the demodulated PUCCH signal by means of the channel decoder 1243 and acquires HARQ ACK/NACK by means of the HARQ ACK/NACK acquirer 1241. The acquired HARQ ACK/NACK is provided to the scheduler so as to be used for determining whether to retransmit the PDSCH. The acquired HARQ ACK/NACK is also provided to the carrier aggregation/timing controller 1201 so as to be used for determining the PDSCH transmission timing.

Figure 13:
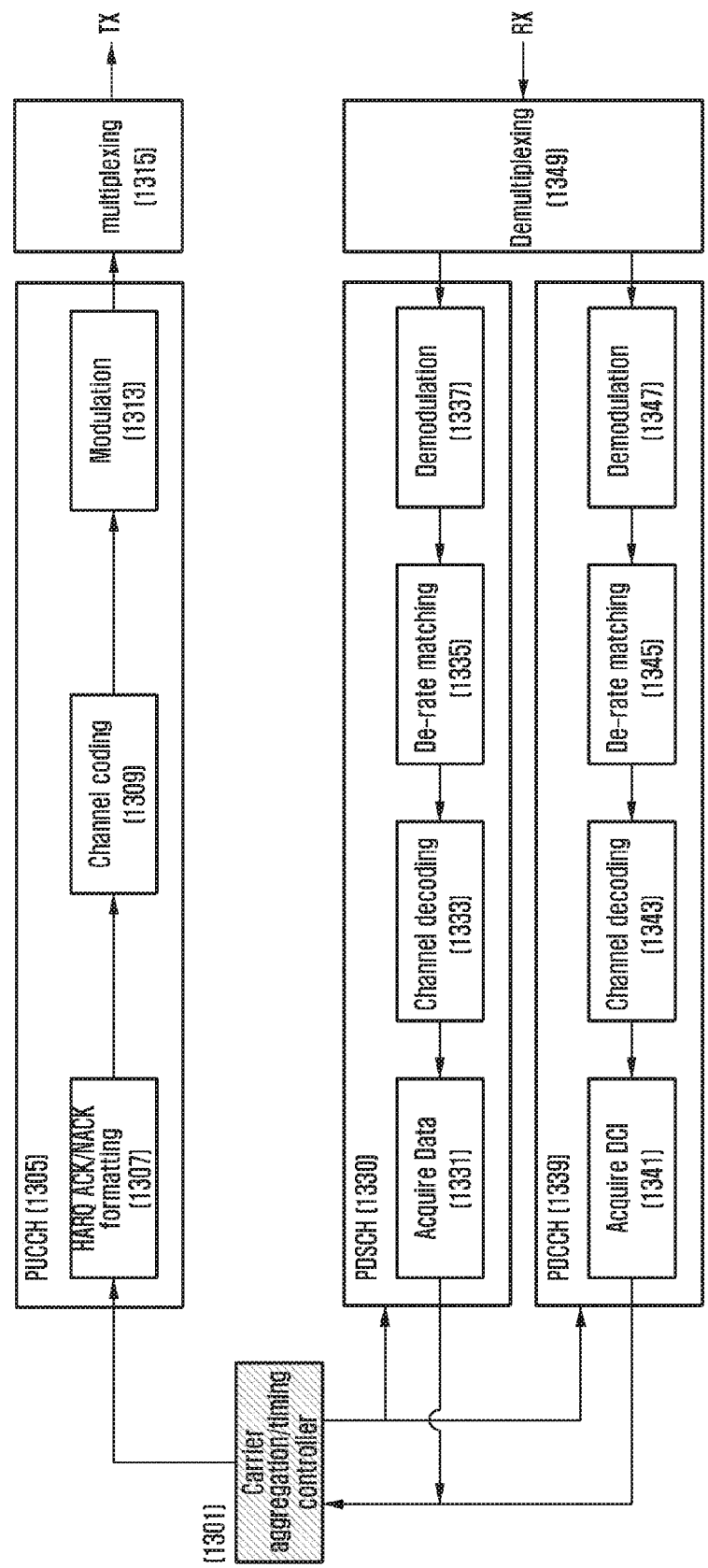
FIG. 13 is a block diagram illustrating a configuration of a UE according to any of the first to fourth exemplary embodiments of the present invention.

FIG. 13 is a block diagram illustrating a configuration of a UE according to any of the first to fourth exemplary embodiments of the present invention.

Referring to FIG. 13, the UE includes a transmission part (TX) comprising a carrier aggregation/timing controller 1301, a PUCCH block 1305, and a multiplexer 1315; and a reception part (RX) comprising a PDSCH block 1330, a PDCCH block 1339, a demultiplexer 1349. The PUCCH block 1305 of the transmission part includes an HARQ ACK/NACK formatter 1307, a channel coder 1309, and a modulator 1313. The PDSCH block 1330 of the reception part includes a demodulator 1337, a de-rate matcher 1335, a channel decoder 1333, and a data acquirer 1331. The PDCCH block 1339 includes a demodulator 1347, a de-rate matcher 1345, a channel decoder 1343, and a DCI acquirer 1341.

The carrier aggregation/timing controller 1301 adjusts the carrier aggregation state of the UE based on the DCI received from the eNB. The carrier aggregation and timing controller 1301 determines the carrier for receiving PDSCH in cross-carrier scheduling mode and the timing relationship among the physical channel and notifies the PUCCH block 1305, PDSCH block 1330, and PDCCH block 1339 of the determination result. The timing relationship is determined according to one of the above-described exemplary embodiments of the present invention.

In more detail, the carrier aggregation/timing controller 1301 controls to receive the downlink physical channel transmitted by the eNB through at least one of the first and second cells. The carrier aggregation/timing controller 1301 also controls such that the uplink physical channel is transmitted at a predetermined timing through the first cell. The carrier aggregation/timing controller 1301 also controls such that the uplink physical channel of the second cell is transmitted at the uplink physical channel transmission timing of the first cell.

In a case where the downlink physical channels of the first and second cells are transmitted from the eNB at the same timing, the carrier aggregation/timing controller 1301 configures such that the uplink physical channel transmission timing of the second cell matches the uplink physical channel transmission timing of the first cell. Also, when the downlink physical channels of the first and second cells are received from the eNB at different timings, the carrier aggregation/timing controller 1301 configures the uplink physical transmission timing of the second cell to match the uplink physical channel transmission timing configured for the downlink subframe of the first cell which is closest to the downlink physical transmission timing of the second cell.

In this case, the carrier aggregation/timing controller 1301 can control such that the uplink physical channels of the first and second cells are transmitted to the eNB as distributed across the uplink subframes as equally as possible.

The PUCCH block 1305 of the transmitter configures the HARQ ACK/NACK by means of the HARQ ACK/NACK formatter 1307 under the timing control of the carrier aggregation/timing controller 1201. The HARQ ACK/NACK is channel coded with the addition of error correction code capability by the channel coder 1309, modulated by the modulator 1313, and multiplexed with other signals by the multiplexer 1315.

The PDSCH block 1330 of the reception part separates the PDSCH signal from the received signal by means of the demultiplexer 1349. The PDSCH block 1330 demodulates the PDSCH signal by means of the demodulator 1337 and reconfigures the symbols before rate matching by means of the de-rate matcher 1335. The PDSCH block 1330 decodes the reconfigured symbols by means of the channel decoder 1333 and acquires PDSCH data by means of the data acquirer 1331. The data acquirer 1331 notifies the PUSCH block 1305 of the error occurrence in the decoding result to control generation of the uplink HARQ ACK/NACK. The data acquirer 1331 provides the carrier aggregation/timing controller 1301 with the decoding result to adjust the HARQ ACK/NACK transmission timing.

The PDCCH block 1339 separates PDCCH signal from the received signal by means of the demultiplexer 1349. The PDCCH block 1339 demodulates the separated PDCCH signal by means of the demodulator 1347 and decodes the demodulated signal by means of the channel decoder 1343. The PDCCH block 1339 acquires DCI from the decoded PDCCH signal by means of the DCI acquirer 1341. The acquired DCI is provided to the carrier aggregation/timing controller 1301 so as to be used for adjusting the HARQ ACK/NACK transmission timing.

As described above, the physical channel transmission/reception timing configuration method and apparatus of exemplary embodiments of the present invention is capable of minimizing data and/or control channel transmission/reception error and transmission delay by defining the transmission timing among the physical data and control channels in the TDD wireless communication system securing broadband resource through carrier aggregation.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for communication of a base station in a communication system, the method comprising:
    transmitting, to a terminal, information for a first time division duplex (TDD) uplink/downlink (UL/DL) configuration of a primary cell;
    transmitting, to the terminal, information for a second TDD UL/DL configuration of a secondary cell;
    transmitting, to the terminal, first downlink control information to schedule first data for the secondary cell, wherein if the first downlink control information is transmitted on a first subframe of the secondary cell, the first subframe is identified based on the second TDD UL/DL configuration; and
    receiving, from the terminal, first feedback information corresponding to the first data on a second subframe of the primary cell, the second subframe being identified based on the first TDD UL/DL configuration.

2. The method of claim 1, further comprising:
    transmitting, to the terminal, second downlink control information to schedule second data for the primary cell, the second downlink control information being transmitted on a third subframe of the primary cell identified based on the first TDD UL/DL configuration and the third subframe corresponding to the first subframe of the secondary cell; and receiving, from the terminal, second feedback information corresponding to the second data on the second subframe of the primary cell.

3. The method of claim 1, wherein, if the first downlink control information transmitted on a fourth subframe of the primary cell corresponding to the first subframe, the fourth subframe is identified based on the first TDD UL/DL configuration.

4. The method of claim 1, wherein the receiving of the first feedback information corresponding to the first data comprises:
receiving, from the terminal, the feedback information corresponding to the first data on the second subframe of the primary cell based on the first TDD UL/DL configuration, if any subframe of the second TDD UL/DL configuration corresponding to an uplink subframe of the first TDD UL/DL configuration is an uplink subframe.

5. The method of claim 1,
wherein the first UL/DL configuration is TDD UL/DL configuration 3 and the second TDD UL/DL configuration is TDD UL/DL configuration 1, or
wherein the first TDD UL/DL configuration is TDD UL/DL configuration 3 and the second TDD UL/DL configuration is TDD UL/DL configuration 4, or
wherein the first TDD UL/DL configuration is TDD UL/DL configuration 6 and the second TDD UL/DL configuration is TDD UL/DL configuration 2, or
wherein the first TDD UL/DL configuration is TDD UL/DL configuration 0 and the second TDD UL/DL configuration is TDD UL/DL configuration 2, or
wherein the first TDD UL/DL configuration is TDD UL/DL configuration 1 and the second TDD UL/DL configuration is TDD UL/DL configuration 0.

6. A method for communication of a terminal in a communication system, the method comprising:
receiving, from a base station, information for a first time division duplex (TDD) uplink/downlink (UL/DL) configuration of a primary cell;
receiving, from the base station, information for a second TDD UL/DL configuration of a secondary cell;
receiving, from the base station, first downlink control information to schedule first data for the secondary cell, wherein if the first downlink control information is received on a first subframe of the secondary cell, the first subframe is identified based on the second TDD UL/DL configuration; and
transmitting, to the base station, first feedback information corresponding to the first data on a second subframe of the primary cell, the second subframe being identified based on the first UL/DL configuration.

7. The method of claim 6, further comprising:
receiving, from the base station, second downlink control information to schedule second data for the primary cell, the second downlink control information being received on a third subframe of the primary cell identified based on the first UL/DL configuration and the third subframe corresponding to the first subframe of the secondary cell; and
transmitting, to the base station, second feedback information corresponding to the second data on the second subframe of the primary cell.

8. The method of claim 6, wherein if the first downlink control information is transmitted on a fourth subframe of the primary cell corresponding to the first subframe, the fourth subframe is identified based on the first TDD UL/DL configuration.

9. The method of claim 6, wherein the transmitting of the first feedback information corresponding to the first data comprises:
transmitting, to the base station, the first feedback information corresponding to the first data on the second subframe of the primary cell based on the first UL/DL configuration, if any subframe of the second TDD UL/DL configuration corresponding to an uplink subframe of the first TDD UL/DL configuration is an uplink subframe.

10. The method of claim 6,
wherein the first TDD UL/DL configuration is TDD UL/DL configuration 3 and the second TDD UL/DL configuration is TDD UL/DL configuration 1, or
wherein the first TDD UL/DL configuration is TDD UL/DL configuration 3 and the second TDD UL/DL configuration is TDD UL/DL configuration 4, or
wherein the first TDD UL/DL configuration is TDD UL/DL configuration 6 and the second TDD UL/DL configuration is TDD UL/DL configuration 2, or
wherein the first TDD UL/DL configuration is TDD UL/DL configuration 0 and the second TDD UL/DL configuration is TDD UL/DL configuration 2, or
wherein the first TDD UL/DL configuration is TDD UL/DL configuration 1 and the second TDD UL/DL configuration is TDD UL/DL configuration 0.

11. A base station in a communication system, the base station comprising:
a transceiver configured to transmit and receive a signal; and
a controller coupled to the transceiver and configured to:
transmit, to a terminal, information for a first time division duplex (TDD) uplink/downlink (UL/DL) configuration of a primary cell,
transmit, to the terminal, information for a second TDD UL/DL configuration of a secondary cell,
transmit, to the terminal, first downlink control information to schedule first data for the secondary cell, wherein if the first downlink control information is transmitted on a first subframe of the secondary cell, the first subframe is identified based on the second TDD UL/DL configuration, and
receive, from the terminal, first feedback information corresponding to the first data on a second subframe of the primary cell, the second subframe being identified based on the first UL/DL configuration.

12. The base station of claim 11, wherein the controller is further configured to:
transmit, to the terminal, second downlink control information to schedule second data for the primary cell, the second downlink control information being transmitted on a third subframe of the primary cell identified based on the first UL/DL configuration and the third subframe corresponding to the first subframe of the secondary cell, and
receive, from the terminal, second feedback information corresponding to the second data on the second subframe of the primary cell.

13. The base station of claim 11, wherein, if the first downlink control information is transmitted on a fourth subframe the primary cell corresponding to the first subframe, the fourth subframe is identified based on the first TDD UL/DL configuration.

14. The base station of claim 11, wherein the controller is further configured to receive, from the terminal, the feedback information corresponding to the first data on the second subframe of the primary cell based on the first UL/DL configuration, if any subframe of the second TDD UL/DL configuration corresponding to an uplink subframe of the first TDD UL/DL configuration is an uplink subframe.

15. The base station of claim 11,
wherein the first TDD UL/DL configuration is TDD UL/DL configuration 3 and the second TDD UL/DL configuration is TDD UL/DL configuration 1, or
wherein the first TDD UL/DL configuration is TDD UL/DL configuration 3 and the second TDD UL/DL configuration is TDD UL/DL configuration 4, or
wherein the first TDD UL/DL configuration is TDD UL/DL configuration 6 and the second TDD UL/DL configuration is TDD UL/DL configuration 2, or
wherein the first TDD UL/DL configuration is TDD UL/DL configuration 0 and the second TDD UL/DL configuration is TDD UL/DL configuration 2, or
wherein the first TDD UL/DL configuration is TDD UL/DL configuration 1 and the second TDD UL/DL configuration is TDD UL/DL configuration 0.

16. A terminal in a communication system, the terminal comprising:
a transceiver configured to transmit and receive a signal; and
a controller coupled to the transceiver and configured to:
receive, from a base station, information for a first time division duplex (TDD) uplink/downlink (UL/DL) configuration of a primary cell,
receive, from the base station, information for a second TDD UL/DL configuration of a secondary cell,
receive, from the base station, first downlink control information to schedule first data for the secondary cell, wherein if the first downlink control information is received on a first subframe of the secondary cell, the first subframe is identified based on the second TDD UL/DL configuration, and
transmit, to the base station, first feedback information corresponding to the first data on a second subframe of the primary cell, the second subframe being identified based on the first UL/DL configuration.

17. The terminal of claim 16, wherein the controller is further configured to:
receive, from the base station, second downlink control information to schedule second data for the primary cell, the second downlink control information being received on a third subframe of the primary cell identified based on the first UL/DL configuration and the third subframe corresponding to the first subframe of the secondary cell, and
transmit, to the base station, second feedback information corresponding to the second data on the second subframe of the primary cell.

18. The terminal of claim 16, wherein, if the first downlink control information is transmitted on a fourth subframe of the primary cell corresponding to the first subframe, the fourth subframe is identified based on the first TDD UL/DL configuration.

19. The terminal of claim 16, wherein the controller is further configured to:
transmit, to the base station, the first feedback information corresponding to the first data on the second subframe of the primary cell based on the first UL/DL configuration, if any subframe of the second TDD UL/DL configuration corresponding to an uplink subframe of the first TDD UL/DL configuration is an uplink subframe.

20. The terminal of claim 16,
wherein the first TDD UL/DL configuration is TDD UL/DL configuration 3 and the second TDD UL/DL configuration is TDD UL/DL configuration 1, or
wherein the first TDD UL/DL configuration is TDD UL/DL configuration 3 and the second TDD UL/DL configuration is TDD UL/DL configuration 4, or
wherein the first TDD UL/DL configuration is TDD UL/DL configuration 6 and the second TDD UL/DL configuration is TDD UL/DL configuration 2, or
wherein the first TDD UL/DL configuration is TDD UL/DL configuration 0 and the second TDD UL/DL configuration is TDD UL/DL configuration 2, or
wherein the first TDD UL/DL configuration is TDD UL/DL configuration 1 and the second TDD UL/DL configuration is TDD UL/DL configuration 0.

* * * * *